US011600119B2

(12) United States Patent
San Miguel et al.

(10) Patent No.: US 11,600,119 B2
(45) Date of Patent: Mar. 7, 2023

(54) REMOTE VEHICLE STATE ESTIMATION SYSTEMS AND METHODS

(71) Applicant: PROPELLER AEROBOTICS PTY LTD, Surry Hills (AU)

(72) Inventors: Rory Leon San Miguel, Surry Hills (AU); Frederick James Greer, Surry Hills (AU); Angus Keatinge, Surry Hills (AU); Ben Vincent Brown, Surry Hills (AU); Kevin John Smith, Surry Hills (AU); Christopher Francis Cooper, Surry Hills (AU); Tony Qi Ye Luk, Surry Hills (AU); Per Arne Hallström, Surry Hills (AU)

(73) Assignee: Propeller Aerobotics Pty Ltd, New South Wales (AU)

( * ) Notice: Subject to any disclaimer, the term of this patent is extended or adjusted under 35 U.S.C. 154(b) by 391 days.

(21) Appl. No.: 16/789,109

(22) Filed: Feb. 12, 2020

(65) Prior Publication Data

US 2020/0258324 A1 Aug. 13, 2020

Related U.S. Application Data

(60) Provisional application No. 62/804,585, filed on Feb. 12, 2019.

(51) Int. Cl.
*G07C 5/08* (2006.01)
*G01C 21/26* (2006.01)
*G07C 5/00* (2006.01)

(52) U.S. Cl.
CPC ........... *G07C 5/0808* (2013.01); *G01C 21/26* (2013.01); *G07C 5/008* (2013.01)

(58) Field of Classification Search
CPC ...... G07C 5/0808; G07C 5/008; G01C 21/26; G01C 21/005; G01S 19/47; G01S 5/0027; G01S 5/021; G01S 19/07; G01S 19/52; G01S 19/43; G01S 2205/001; B60W 2300/12; B60W 2300/17; H04L 67/12; H04W 4/02
See application file for complete search history.

(56) References Cited

U.S. PATENT DOCUMENTS

| | | | |
|---|---|---|---|
| 10,032,275 B1 | 7/2018 | Watson et al. | |
| 2007/0005306 A1* | 1/2007 | Foessel | G01S 13/723 702/189 |
| 2011/0054729 A1* | 3/2011 | Whitehead | A01B 69/007 701/50 |
| 2016/0078140 A1* | 3/2016 | Chen | G06F 16/9535 701/532 |
| 2016/0231429 A1 | 8/2016 | Wilson et al. | |
| 2017/0052028 A1 | 2/2017 | Choudhury et al. | |
| 2018/0095742 A1 | 4/2018 | Richter et al. | |

FOREIGN PATENT DOCUMENTS

WO 2012025128 A1 3/2012

* cited by examiner

*Primary Examiner* — Michael V Kerrigan
(74) *Attorney, Agent, or Firm* — David R. Stevens; Stevens Law Group

(57) ABSTRACT

Systems and methods to perform remote monitoring on a vehicle are described. One embodiment determines a state of a vehicle, where data associated with the vehicle is collected and logged. The data is transmitted to a data server. The data is processed, and vehicle information is extracted from the data. A state of the vehicle is determined based on the vehicle information.

21 Claims, 20 Drawing Sheets

REMOTE VEHICLE STATE ESTIMATION SYSTEMS AND METHODS

RELATED APPLICATION

This application claims the priority benefit of U.S. Provisional Application Ser. No. 62/804,585, entitled "Remote Vehicle Status And Terrain Elevation Estimation Systems And Methods," filed Feb. 12, 2019, the disclosure of which is incorporated by reference herein in its entirety.

BACKGROUND

Technical Field

The present disclosure relates to systems and methods that determine a state of a vehicle in substantially real-time, thereby allowing remote monitoring of a single vehicle, or a fleet of vehicles.

Background Art

Commercial vehicle fleet deployments entail a set of vehicles being present in a specified area of operation for a specified amount of time. For example, a group of construction vehicles at a construction site perform assigned functions in a collaborative effort to complete a specified construction task within a certain time frame. In such cases, monitoring a status, or state, of each vehicle in a fleet allows an owner of the fleet to remotely observe how each vehicle is operating and remotely determine, for example, whether a vehicle is subject to excessive idling. Furthermore, it is helpful to be able to remotely capture a measure of a terrain altitude associated with a vehicle while the vehicle performs its designated task. An example of such a task is changing the terrain altitude during an earthmoving operation. There exists a need, therefore, for a system that is able to remotely determine a status of one or more vehicles.

SUMMARY

An embodiment of a method to determine a state of a vehicle includes collecting data associated with the vehicle. The data is logged, and transmitted to a data server. The data stored on the data server is read, processed, and vehicle information is extracted from the data. A state of the vehicle is determined based on the vehicle information, and the state may include any combination of a vehicle position, a vehicle velocity, a vehicle acceleration, and a terrain altitude. The embodiment may include a vehicle information transmitter associated with the vehicle, where the vehicle information transmitter is calibrated prior to use. This calibration process may include defining a first reference point and a second reference point with respect to the vehicle. The calibration process may also include estimating an altitude of the vehicle information transmitter above a ground level. The vehicle information transmitter may be recalibrated on a continuous basis.

Some embodiments determine whether the vehicle is moving, in an idle state, or off. A binary variable may be generated, where the binary variable assumes a nonzero value when a velocity associated with the vehicle is nonzero, and a zero value when the velocity is zero.

Embodiments of apparatuses configured to determine a state of a vehicle may include a vehicle information transmitter physically coupled to the vehicle, and a data server communicatively coupled to the vehicle information transmitter. The data server may include a database and a computing system. In embodiments, the vehicle information transmitter collects and logs data associated with the vehicle, and transmits the data to the data server. The data server stores the data. The data server extracts vehicle information from the data, and determines a state of the vehicle based on the vehicle information. In particular embodiments, the vehicle information transmitter may be identified by a unique device ID. The vehicle information transmitter may include a GPS and an IMU, and may also include a solar panel. In some embodiments, the data server includes a database to store the data, and a computing system to perform computing operations on the data.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
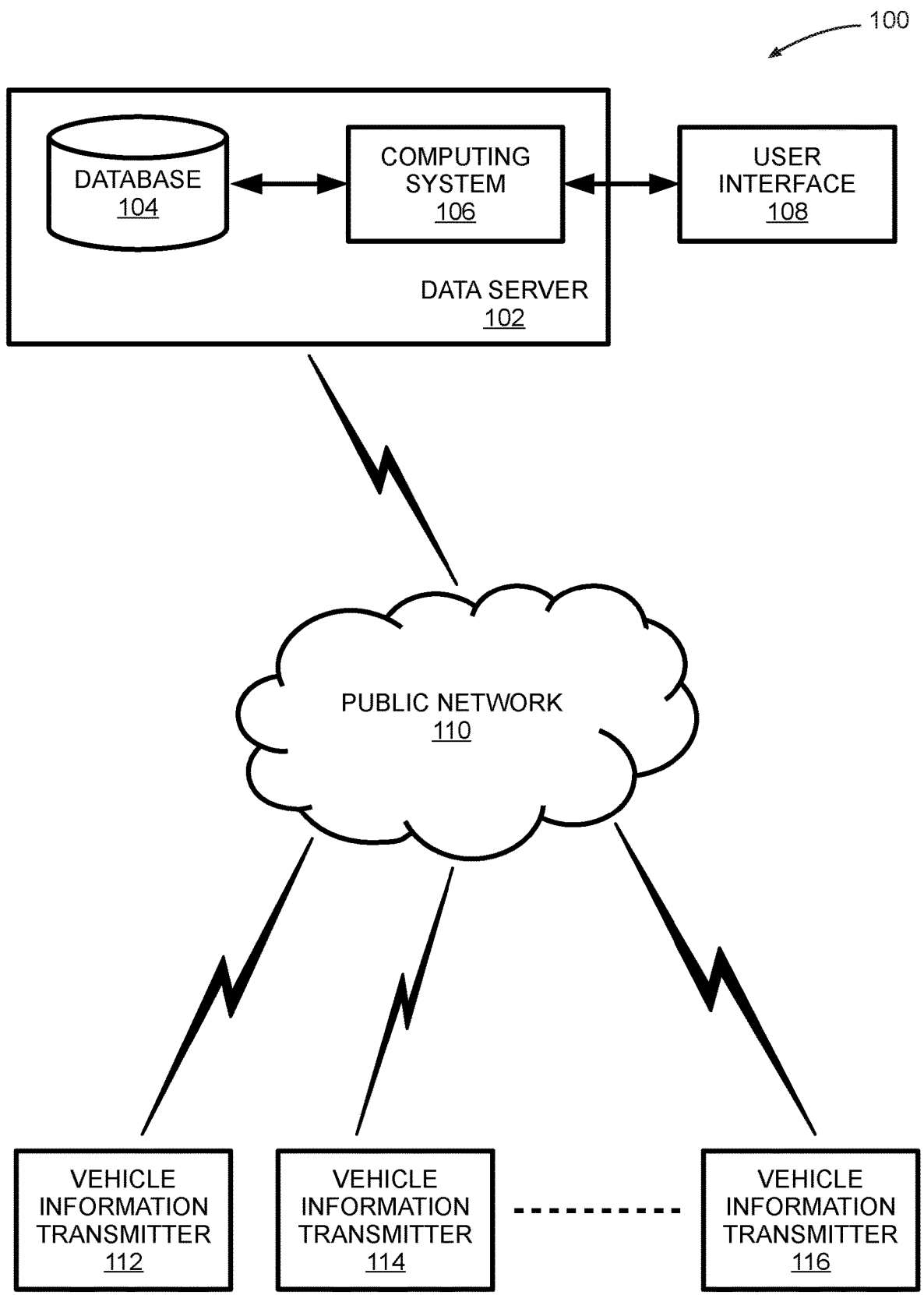
FIG. 1 is a block diagram depicting an embodiment of a remote vehicle state estimation system.

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, a magnetic storage device, and any other storage medium now known or hereafter discovered. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which includes one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The systems and methods described herein relate to remotely determining a state of one or more vehicles. In some embodiments, a vehicle information transmitter is associated with a vehicle. The vehicle information transmitter may be configured to collect and log data associated with the vehicle, and transmit the data to a data server that may be remote from the vehicle. The vehicle data may be processed to determine a state of the vehicle from the data.

FIG. 1 is a block diagram depicting an embodiment of a remote vehicle state estimation system 100. In some embodiments, remote vehicle state estimation system 100 includes a plurality of vehicle information transmitters—a vehicle information transmitter 112, a vehicle information transmitter 114, through a vehicle information transmitter 116. In some implementations, each of vehicle information transmitter 112 through vehicle information transmitter 116 is associated with a unique vehicle (not depicted in FIG. 1). In particular embodiments, one or more of vehicle information transmitter 112 through vehicle information transmitter 116 may be physically coupled (i.e., affixed) to the respective vehicle.

In some embodiments, each of vehicle information transmitter 112 through vehicle information transmitter 116 is configured to communicate with a data server 102 via a public network 110. An example of public network 110 is the Internet. In some embodiments, data server 102 is at a remote location from vehicle information transmitter 112 through vehicle information transmitter 116. In some embodiments, each of vehicle information transmitter 112 through vehicle information transmitter 116 may communicate with data server using, for example, a wireless communication protocol such as a wireless data service (wireless Internet), or a wireless mobile data protocol.

In some embodiments, each of vehicle transmitter 112 through vehicle transmitter 116 is configured to collect data associated with the respective vehicle corresponding to vehicle transmitter 112 through vehicle transmitter 116. In some embodiments, this data includes a vehicle state, where the vehicle state for each vehicle includes a vehicle position, a vehicle velocity, a vehicle acceleration, and a terrain altitude associated with the vehicle. In particular embodiments, terrain altitude is a relative measure of a height of a terrain on which the vehicle is standing. In embodiments, a relative measure of the height of the terrain may be referenced to sea level.

In some embodiments, each of vehicle information transmitter 112 through vehicle information transmitter 116 is configured to log the data associated with the corresponding vehicle. The data for each vehicle may be time-stamped and stored in each associated vehicle information transmitter. In embodiments, each of vehicle information transmitter 112 through vehicle information transmitter 116 is configured to transmit the logged data to data server 102 via public network 110.

In some embodiments, data server 102 receives the logged data from each of vehicle information transmitter 112 through vehicle information transmitter 116 and stores the data in a database 104 included in data server 102. The data stored in database 104 may include data (i.e., logged data, or datasets) associated with multiple vehicles. A computing system 106 included in some embodiments of data server 102 reads the data from database 104, and processes the data to extract vehicle information for each vehicle from the data corresponding to that vehicle. In some embodiments, the vehicle information includes a vehicle position, a vehicle velocity, and a vehicle acceleration. In embodiments, computing system 106 is configured to determine a state of the vehicle based on the vehicle information. Computing system 106 may also be configured to perform other computing functions associated with an operation of remote vehicle stat estimation system 100, as described herein.

In some embodiments, a user interface 108 is communicatively coupled with computing system 106. User interface 108 may be configured to allow a user to interact with data server 102. Specifically, user interface 108 may allow a user to input commands to computing system 106 via, for example, a keyboard, a mouse, voice commands, and so on. The user input commands might include requests to view, list or sort data sets or data subsets associated with a specific vehicle. For example, a user may want to view data corresponding to a specific vehicle information transmitter for a specific time window. Computing system 106 processes the user requests, retrieves the requested data from database 104, and presents the requested data to the user via user interface 108 in a suitable format. The user may view this data on a video display monitor, or print the data using a printing device.

In some embodiments, data server 102 and vehicle information transmitter 112 through vehicle information transmitter 116 are located at geographically distinct locations. In other words, data server 102 is configured to remotely receive and process data transmitted by each of vehicle information transmitter 112 through vehicle information transmitter 116. Each of vehicle information transmitter 112 through vehicle information transmitter 116 transmits vehicle-related information such as vehicle position to data server 102. Computing system 106 uses this data to determine a state of the vehicle associated with the respective vehicle information transmitter. This allows a user associated with user interface 108 to remotely monitor a status of each vehicle associated with vehicle information transmitter 112 through vehicle information transmitter 116. In other embodiments, user interface 108 may be co-located with a specific vehicle information transmitter, and may receive the vehicle status on a video display monitor on the vehicle itself.

An example of remote vehicle state estimation system 100 is a fleet of vehicles at a mining site or construction site. In some embodiments, one or more vehicles might be each configured with a vehicle information transmitter, and each vehicle is tasked with a specific mining or construction operation. One or more vehicles may be tasked with modifying a terrain associated with the mining site or the construction site (e.g., moving or removing earth). In these example cases, a user may be able to monitor a state associated with each vehicle, and determine how each vehicle is performing its designated task. Unwanted cases such as excessive vehicle idling, that cost a vehicle fleet operator time and money, can be detected in substantially real time if necessary. An option for remote monitoring using, for example, user interface 108 allows a user to remotely monitor a vehicle associated with each of vehicle information transmitter 112 through vehicle information transmitter 116 in substantially near time.

In some embodiments, terrain elevation is a measurement included in the vehicle state associated with each vehicle. As a vehicle traverses over the terrain, a variation in the height of the terrain (i.e., a terrain elevation) can be measured and recorded by the corresponding vehicle information transmitter using the systems and methods described herein. If a path history of each vehicle in a fleet of vehicles operating in a designated area is known (from the vehicle state), then a corresponding terrain elevation history can be correlated against each such path history to generate a three-dimensional map of the terrain associated with the designated area. Alternatively, in a mining or an earthmoving operation, a substantially real-time reading of terrain elevation provides a measure of how quickly the operation is progressing, as terrain elevation along with an area traversed by a vehicle can be used as a measure of how much earth is removed, excavated, cut, or filled by the vehicle. The substantially real-time reading of terrain elevation may also serve as a temporal log or record of how much volume of terrain was moved at a specific point in time. This, in turn, can be used to instruct billing of clients or any other third party associated with the operation(s).

Figure 2:
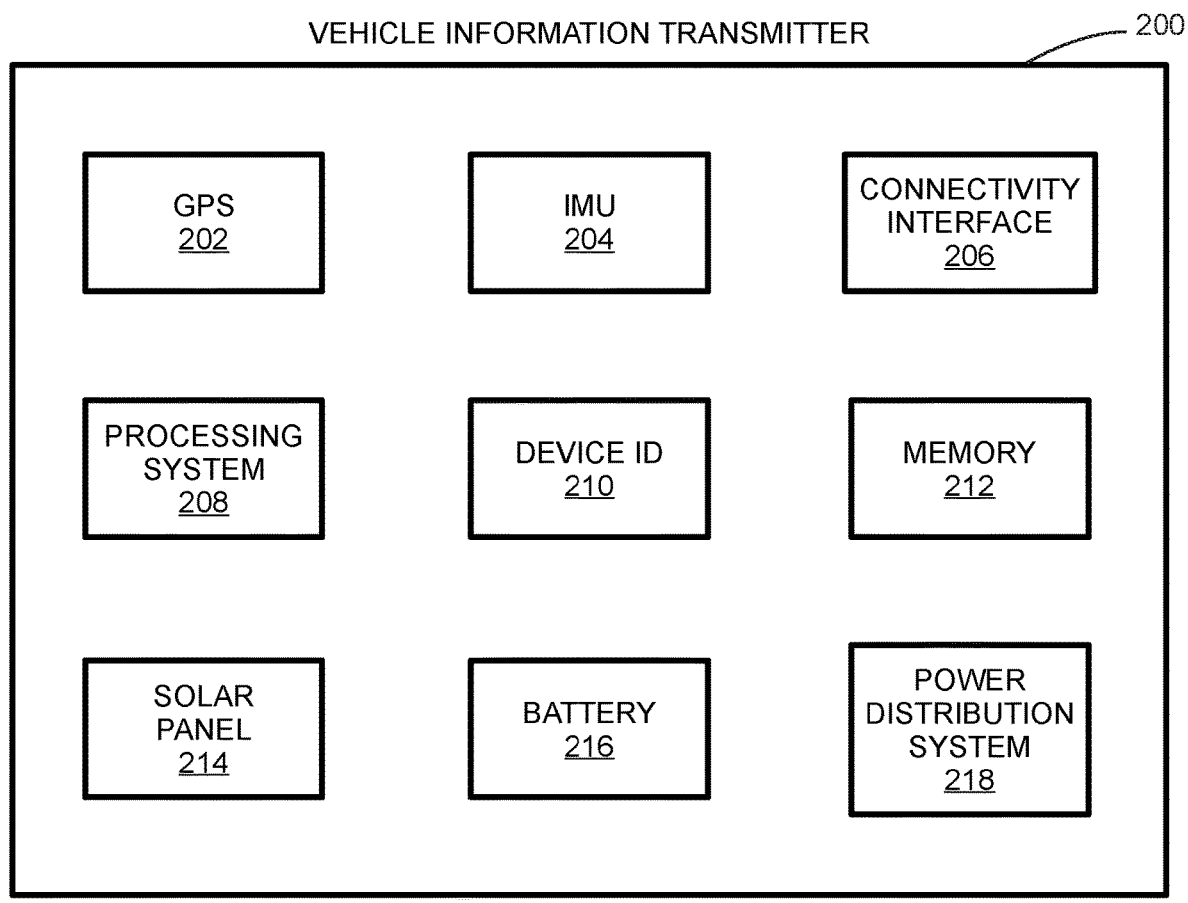
FIG. 2 is a block diagram depicting an embodiment of a vehicle information transmitter.

FIG. 2 is a block diagram depicting an embodiment of a vehicle information transmitter 200. Embodiments of vehicle information transmitter 112 through vehicle information transmitter 116 may be similar to vehicle information transmitter 200. In some embodiments, vehicle information transmitter 200 includes a GPS 202. GPS 202 is a global positioning system receiver that is configured to acquire and track signals from multiple GPS satellites in real time and provide a position fix for vehicle information transmitter 200 and a vehicle associated with vehicle information transmitter 200. In some embodiments, GPS 202 may be configured to generate GNSS data. In an event that vehicle information transmitter 200 is associated with a vehicle, a position fix for vehicle information transmitter 200 also provides a position fix for the vehicle. An IMU 204 is an inertial measurement unit included in some embodiments of vehicle information transmitter 200. In some embodiments, IMU 204 is configured to measure linear and rotational forces, and linear and rotational accelerations acting on vehicle information transmitter 200. Information from IMU 204 may be used to compute vehicle positions and velocities in three dimensions, and also to determine an idle state of a vehicle associated with vehicle information transmitter 200, as discussed herein.

A connectivity interface 206 included in some embodiments of vehicle information transmitter 200 allows vehicle information transmitter 200 to connect or communicate with different other devices. For example, connectivity interface 206 may include a network interface that allows vehicle information transmitter 200 to connect to the internet via, for example, 4G connectivity Wi-Fi connectivity, or some other wireless connection method. Connectivity interface 206 may also include an interface that allows vehicle information transmitter 200 to connect to a local device via, for example, Bluetooth, or some other wired or wireless network protocol. In some embodiments, connectivity interface 206 may include radio frequency (RF) circuitry (such as amplifiers, mixers, and other RF-related components), and one or more antennae that facilitate transmission and reception of RF signals. In particular embodiments, connectivity interface 206 may include a USB interface or an Ethernet interface that allows a user to communicate with vehicle information transmitter 200 via a wired connection. This feature enables a user to perform, for example, diagnostics or debugging operations on vehicle information transmitter 200.

Certain functions of vehicle information transmitter 200 such as data routing are performed by a processing system 208 that is included in some embodiments of vehicle information transmitter 200. In embodiments, processing system 208 may also be responsible for routing data from, for example, GPS 202 to connectivity interface 206. Processing system 208 may also be used to perform other operations such as on-board real-time kinematic (RTK) computations as described herein. A device ID 210 included in some embodiments of vehicle information transmitter 200 is a unique identifier that serves to uniquely identify a particular vehicle information transmitter (such as vehicle information transmitter 200) and distinguish this vehicle information transmitter from other vehicle information transmitters. In some embodiments, device ID 210 generates a device ID code that is unique to vehicle information transmitter 200. This device ID code is transmitted with each transmission from vehicle information transmitter 200. In some embodiments, computing system 106 associated with data server 102 uses a received device ID code to identify which vehicle information transmitter the associated data is being transmitted from. This allows computing system 106 to uniquely identify a specific vehicle associated that particular vehicle information transmitter. A memory 212 included in some embodiments of vehicle information transmitter 200 allows storage of temporary or permanent data by vehicle information transmitter 200. In some embodiments, data may be logged by vehicle information transmitter 200 on an ongoing basis, and continuously or periodically transmitted out to data server 102 via connectivity interface 206. Memory 212 may be any combination of flash memory, disk drives, read-only memory, random access memory, and may include both volatile and non-volatile memory components.

Some embodiments of vehicle information transmitter 200 are powered by a combination of a solar panel 214 and a battery 216. In particular embodiments, solar panel 214 generates electrical power from sunlight to charge battery 216, or to provide electrical power to vehicle information transmitter 200. A power distribution system 218 routes power from any combination of solar panel 214 and battery 216 to associated subsystems of vehicle information transmitter 200.

Figure 3:
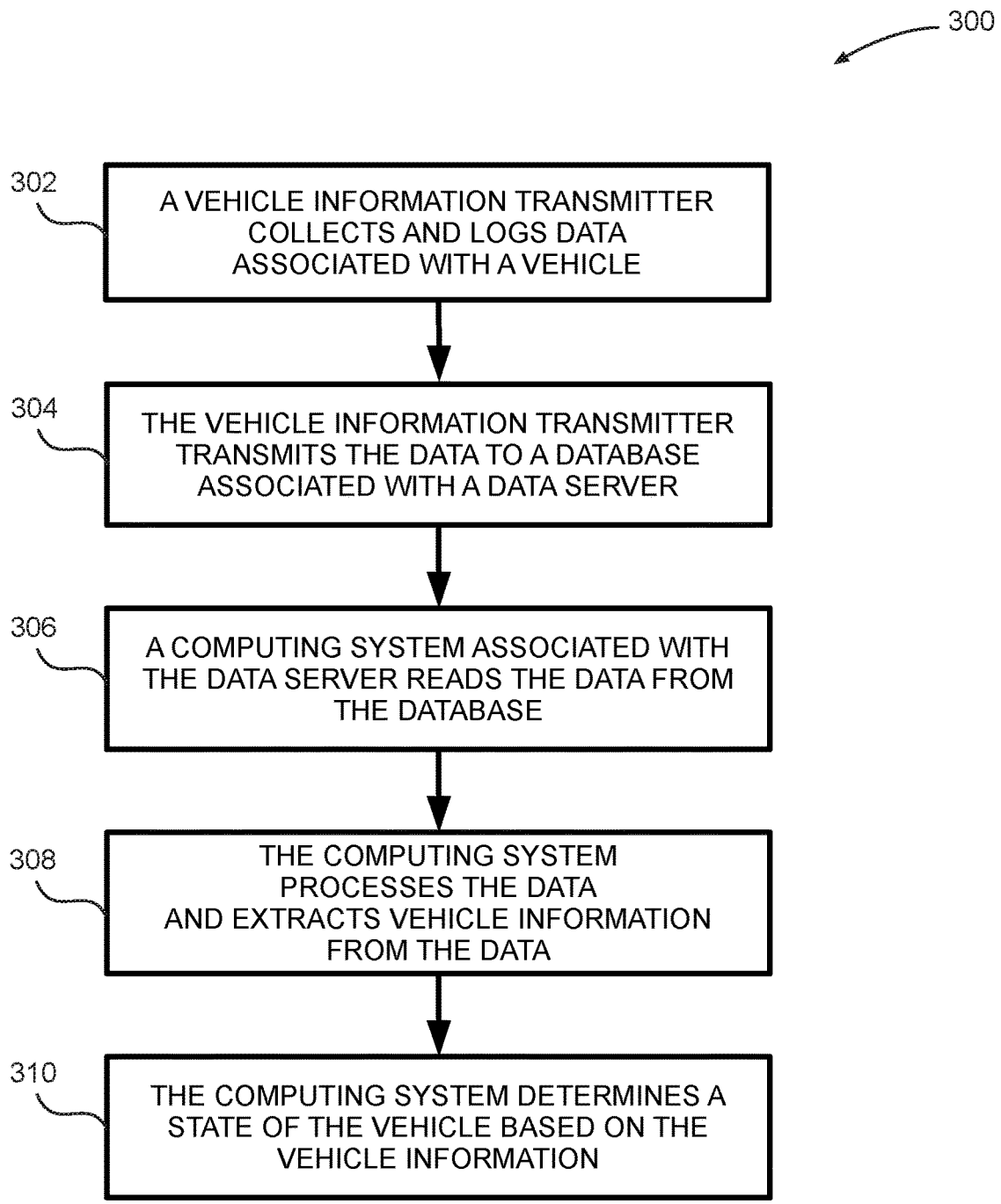
FIG. 3 is a flow diagram depicting an embodiment of a method to determine a state of a vehicle.

FIG. 3 is a flow diagram depicting an embodiment of a method 300 to determine a state of a vehicle. In some embodiments, method 300 relates to computing system 106 associated with data server 102 computing a state of a vehicle associated with a vehicle information transmitter (e.g., vehicle information transmitter 112 through vehicle information transmitter 116) based on information transmitted to data server 102 by the corresponding vehicle information transmitter.

At 302, a vehicle information transmitter collects and logs data associated with a vehicle. In some embodiments, this data can be any combination of GPS data, IMU data or other vehicle-related data such as engine data, vehicle weight data and so on. In particular embodiments, this data is logged in memory such as memory 212, providing a timestamped history, among other features. Next, at 304, the vehicle information transmitter transmits the data to a database (such as database 104) associated with a data server (such as data server 102). The database serves to store data until the data is needed by the data server. At 306, a computing system (such as computing system 106) associated with the data server reads the data from the database, and at 308 the computing system processes the data and extracts vehicle information from the data. This vehicle information could include vehicle position data, IMU data or other vehicle-related data. Finally, at 310, the computing system computes a state of the vehicle using the vehicle information. This vehicle state may be displayed to a user via a user interface (such as user interface 108), who can then remotely monitor the state of the vehicle.

Figure 4:
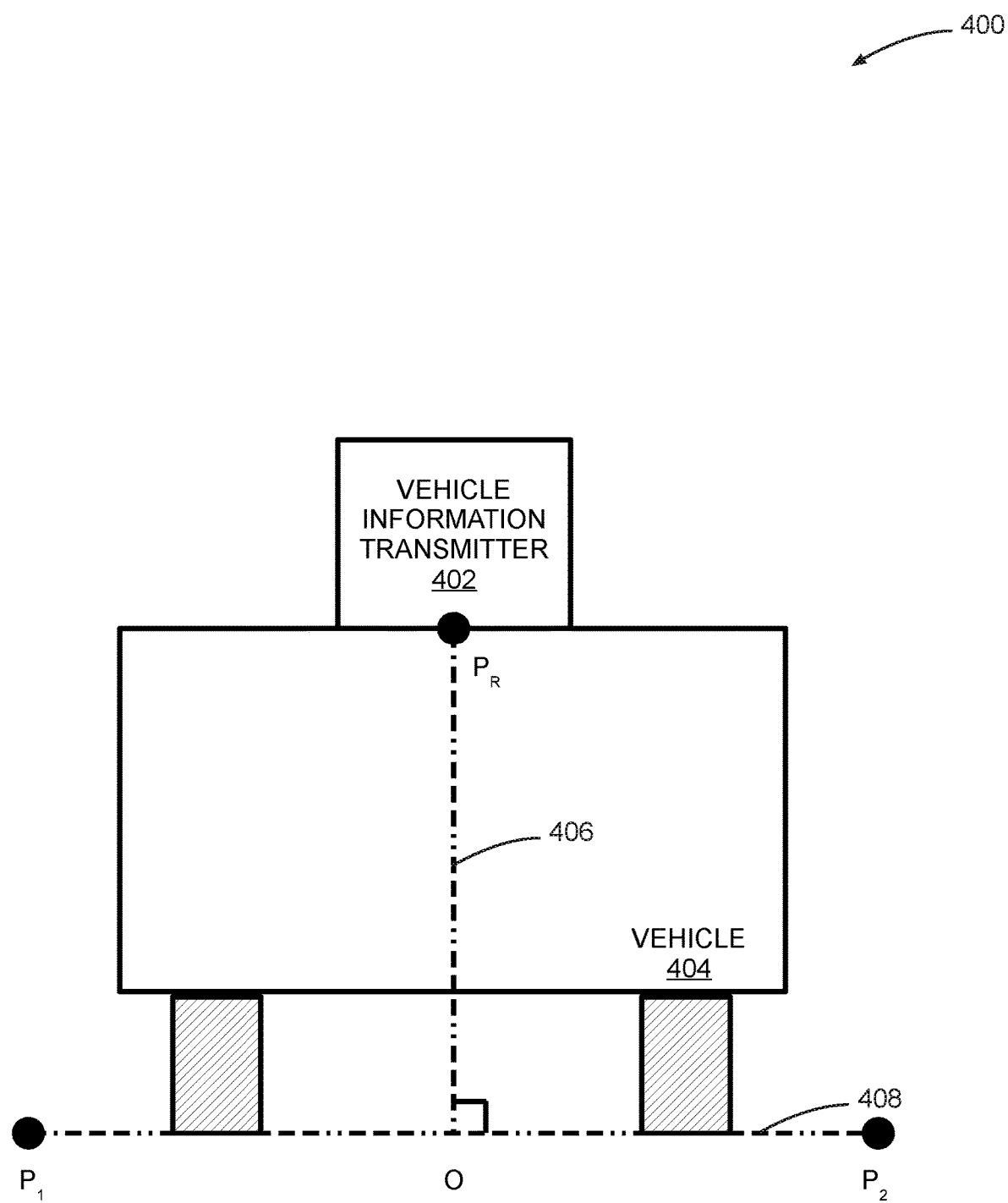
FIG. 4 is a schematic diagram depicting a vehicle calibration and state measurement setup.

FIG. 4 is a schematic diagram depicting a vehicle calibration and state measurement setup 400. In some embodiments, prior to using a vehicle information transmitter for monitoring a state of an associated vehicle, a calibration process must be performed on the vehicle information transmitter. This calibration process takes into account a spatial mounting location on the vehicle. Once this calibration process has been completed, a similar process to the calibration process is used to measure a state (position) of the vehicle information transmitter, and hence, the vehicle. In some embodiments, vehicle calibration and state measurement setup 400 is used for calibration and state measurement of a vehicle.

In some embodiments, vehicle calibration and state measurement setup 400 includes a vehicle information transmitter 402 physically coupled to (i.e., mounted on) a vehicle 404, at a mounting point $P_R$. Vehicle 404 rests on or moves along a terrain. In order to perform a calibration of vehicle information transmitter 402, vehicle 404 is steered to traverse a line 408 joining a first reference point $P_1$ and a second reference point $P_2$, where each of first reference point $P_1$ and second reference point $P_2$ is a known reference point on the terrain. In other words, three dimensional coordinates associated with each of first reference point $P_1$ and second reference point $P_2$ are known a priori. In some embodiments, a point O is selected on line 408 such that a line 406 joining mounting point $P_R$ and point O is perpendicular to line 406. Details about the calibration and measurement processes associated with vehicle information transmitter 402 are provided herein.

Figure 5:
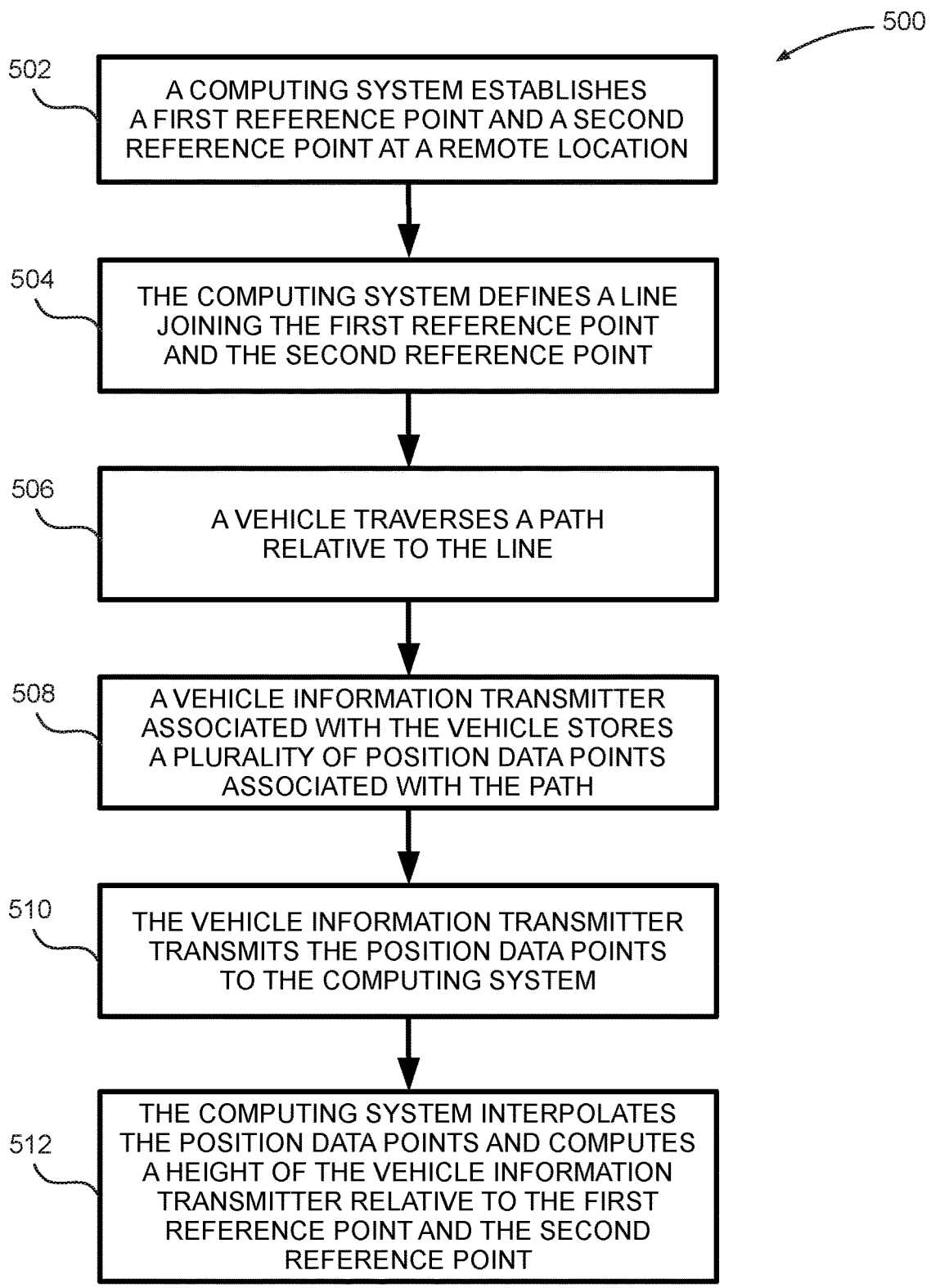
FIG. 5 is a flow diagram depicting an embodiment of a method to calibrate a vehicle information transmitter.

FIG. 5 is a flow diagram depicting an embodiment of a method 500 to calibrate a vehicle information transmitter. At 502, a computing system (such as computing system 106) establishes a first reference point at and a second reference point at a remote location. In some embodiments, the first reference point is first reference point $P_1$ presented in FIG. 4, while the second reference point is second reference point $P_2$ presented in FIG. 4. In particular embodiments, the first reference point and the second reference point are at a remote location (e.g., a work site) with respect to the computing system. In some embodiments, the computing system is similar to computing system 106.

At 504, the computing system defines a line joining the first reference point and the second reference point. In some embodiments, this line may be similar to line 408. Next, at 506, a vehicle (such as vehicle 404) traverses a path relative to the line. At 508, a vehicle information transmitter (e.g., vehicle information transmitter 402) associated with the vehicle stores a plurality of position data points associated with the path. In some embodiments, the vehicle information transmitter uses one or more sensors such as GPS 202 and IMU 204 to generate the position data points, and stores these position data points in memory 212.

At 510, the vehicle information transmitter transmits the position data points to the computing system. In some embodiments, this transmission is performed via public network 110. In embodiments, the position data points may initially be stored in a database such as database 104 prior to being read by the computing system. Finally, at 512, the computing system interpolates the position data points and computes a height of the vehicle information transmitter relative to the first reference point and the second reference point. In some embodiments, this height is related to a length associated with line 406. Using the interpolation, the computing system seeks to determine a location of point $P_R$ that is directly above the line 408. At this point, a height of the terrain below the vehicle is computed, using line 408. Finally, the height of the terrain is subtracted from the height of the vehicle information transmitter to obtain a height for the vehicle.

Essentially, measurements associated with vehicle information transmitter 402 include an elevation of the terrain below the vehicle above sea level (also referred to herein as "terrain elevation"). These measurements also include a length of line 406 which, in turn, is substantially equal to the height of the vehicle above the terrain at the point where the vehicle information transmitter is located. In other words, an elevation measurement generated by vehicle information transmitter 402 includes a combination of the terrain elevation and the length of line 406. When vehicle position data points are transmitted to the computing system, these position data points include the terrain elevation and a positive bias that is substantially equal to the height of the vehicle where the vehicle information transmitter is located. This positive bias is also referred to as a "calibration height." Method 500 aims to compute this calibration height and account for this calibration height in subsequent measurements associated with routine measurement operations by, for example, subtracting the calibration height from elevation measurements, thereby providing a direct measurement of terrain elevation.

In some embodiments, first reference point $P_1$ and second reference point $P_2$ are a priori known reference points associated with the terrain. In other words, the computing system has prior knowledge about parameters (such as an elevation above sea level) associated with each of these reference points. In some embodiments, during the calibration process associated with method 500, a path of the vehicle may intersect line 408. In other embodiments, the path may not intersect line 408.

If a calibration routine is in process as depicted by method 500, then the height for the vehicle is defined as a calibration height of the vehicle. On the other hand, if a measurement routine is in process (for example, during normal vehicle monitoring operations), then the height for the vehicle is included in the vehicle system state taking into account the calibration height (i.e. the bias) computed during the calibration process. In some embodiments, line 408 is also referred to as a "calibration gate."

While FIG. 4 depicts two reference points $P_1$ and $P_2$ on the terrain, this approach can be extended to include multiple reference points that collectively form a polygon in three dimensions. Furthermore, this method can be used to re-calibrate one or more vehicles in a fleet during routine operations, as described herein. The points that define these known lines, planes, and three-dimensional shapes are continuously updated themselves via measurements done by the fleet of mobile machines as well as other surface height measurement devices.

In some embodiments, after a vehicle information transmitter has been calibrated, the vehicle information transmitter can be deployed in a use case, where the vehicle information transmitter measures and logs data associated with the vehicle, and transmits this data to a remote server for further processing.

Figure 6A:
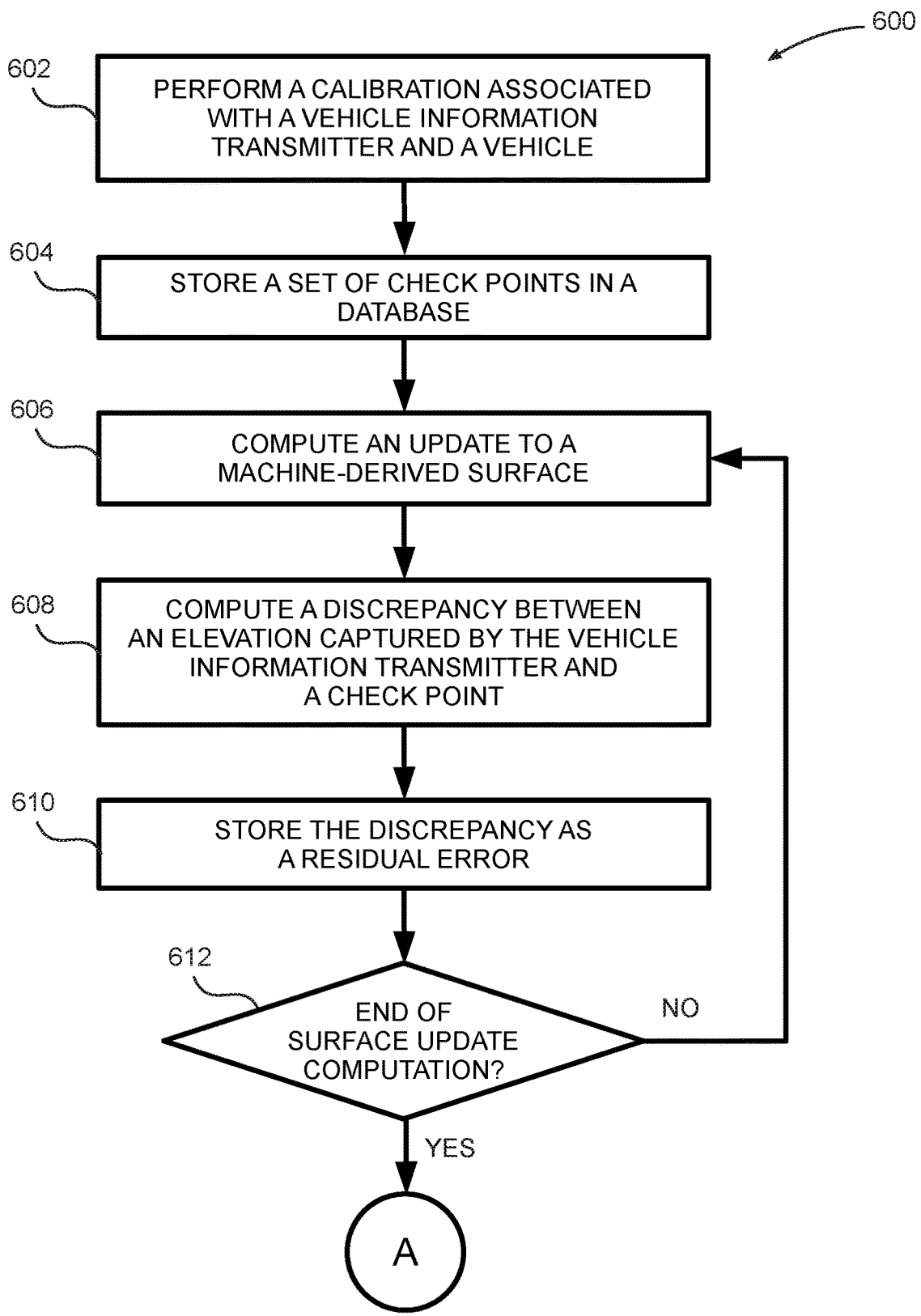
FIGS. 6A and 6B are flow diagrams depicting an embodiment of a method to recalibrate a vehicle information transmitter.

FIG. 6A is a flow diagram depicting an embodiment of a method 600 to recalibrate a vehicle information transmitter. At 602, the method performs a calibration of a vehicle information transmitter and a vehicle, using a method similar to 500. Next, at 604, the method stores a set of (i.e., one or more) check points in a database such as database 104. In some embodiments, a check point is a temporally static, known location on a given region of a terrain. In particular embodiments, known regions of the terrain are also stored in the database along with the check points. In embodiments, a check point is stored in the database as a point represented in a three-dimensional (3D) coordinate system, while a region of the terrain is stored in the database as a polygon in the same 3D coordinate system. In some embodiments, the check points and the regions of terrain are generated a priori using, for example, surveying methods that may include drone surveying or independent equipment used for external validation.

At 606, the method computes an update to a machine-derived surface associated with the terrain. In some embodiments, these updates are referred to as "surface updates," and may be generated using a vehicle information transmitter on a vehicle when the vehicle passes over one or more check points or regions of terrain stored in the database. At 608, the method computes a discrepancy (i.e., a difference) between an elevation captured by the vehicle information transmitter (e.g., via an update) and a check point. At 610, the method stores the discrepancy as a residual error in, for example, the database. At 612, the method checks to see if a computation associated with the surface update is complete. If the computation is not complete, then the method returns to 606. On the other hand, if at 612, the computation is complete, then the method goes to A, with a continued description in the description of FIG. 6B.

Figure 6B:
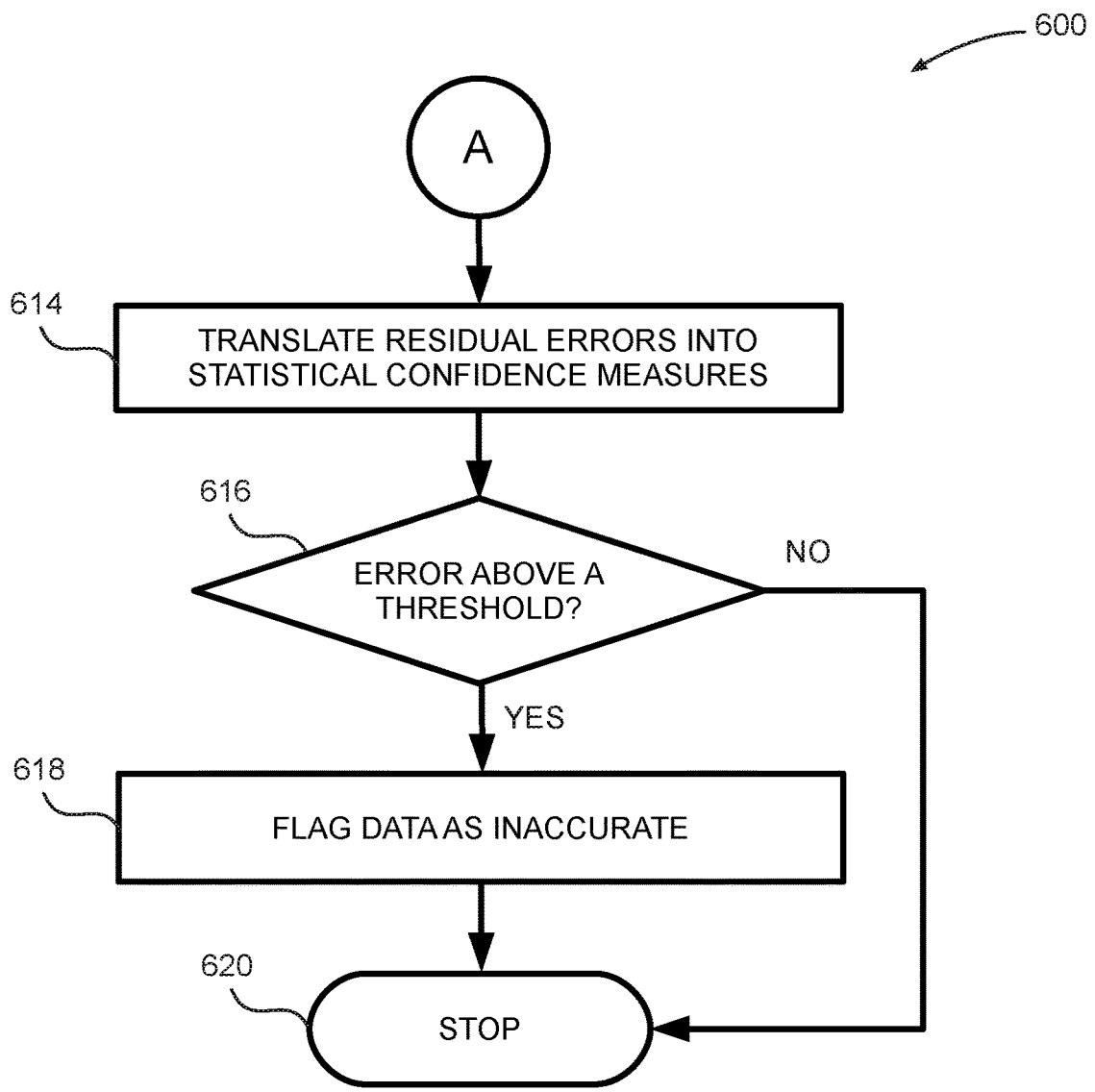

FIG. 6B is a flow diagram depicting a continued description of the method 600. Starting at A, the method goes to 614, where one or more residual errors are translated into statistical confidence measures such as a mean, a standard deviation, a 95% confidence interval, and so on. At 616, the method checks to see if an average or a peak error associated with the residual errors and statistical confidence measures is greater than a threshold. If the average or peak error is not greater than the threshold, then the method interprets the data as substantially accurate, and the method terminates at 620. On the other hand, if at 616 the average or peak error is greater than the threshold, then the method goes to 618, where the data is flagged as inaccurate, and the method terminates at 620.

Method 600 can be extended to include multiple vehicles. In one example, if two or more vehicles have passed over a check point region with low residual error (confirming its validity) and a vehicle information transmitter for a third vehicle shows a residual error that is greater than the threshold, the calibration for the failing vehicle information transmitter can be automatically re-computed by subtracting an associated mean residual error.

Other functions of a remote vehicle state estimation system such as remote vehicle state estimation system 100 include volume calculation methods that can be used in applications like construction sites or mining, where volumes of earth have to be moved by one or more vehicles or machines. Such surface-to-surface volume calculations are required to compute how much volume has been moved within a finite time interval. For example, this technique can be used to answer a user question, "how much volume has been moved on this area of my site in the past 24 hours?" These surface-to-surface volumes are computed using a Riemann sum across height samples in a bounding polygonal area. Sampling and summing for a single volume computation are distributed across multiple servers (e.g., multiple versions of data server 102) so they can compute in parallel using, for example, a map-reduce algorithm to reduce an overall time to compute a result. Resulting volume quantities can be charted across time to track progress and productivity trends. For example, charting volume moved in an area for each day in a week allows an owner of a fleet of vehicles to monitor overall progress and productivity, thereby enabling the owner to make informed decisions to improve overall efficiency and save money.

Since volume calculations can be expensive to compute, the results are cached in some embodiments of a remote vehicle state estimation system. A unique fingerprint (hash) is generated for a specific volume calculation. This hash may be generated from a combination of surfaces, a bounding polygon and other data. It is assumed that results are deterministic, so for a given surface to surface volume request e.g. surfaceA, surfaceB, polygon an associated volume result (e.g. cubic metres of change) will be the same. A hash can therefore be created from {surfaceA, surfaceB, polygon}, and can be used as a lookup into a cache of previously computed values to avoid re-computation.

Figure 7A:
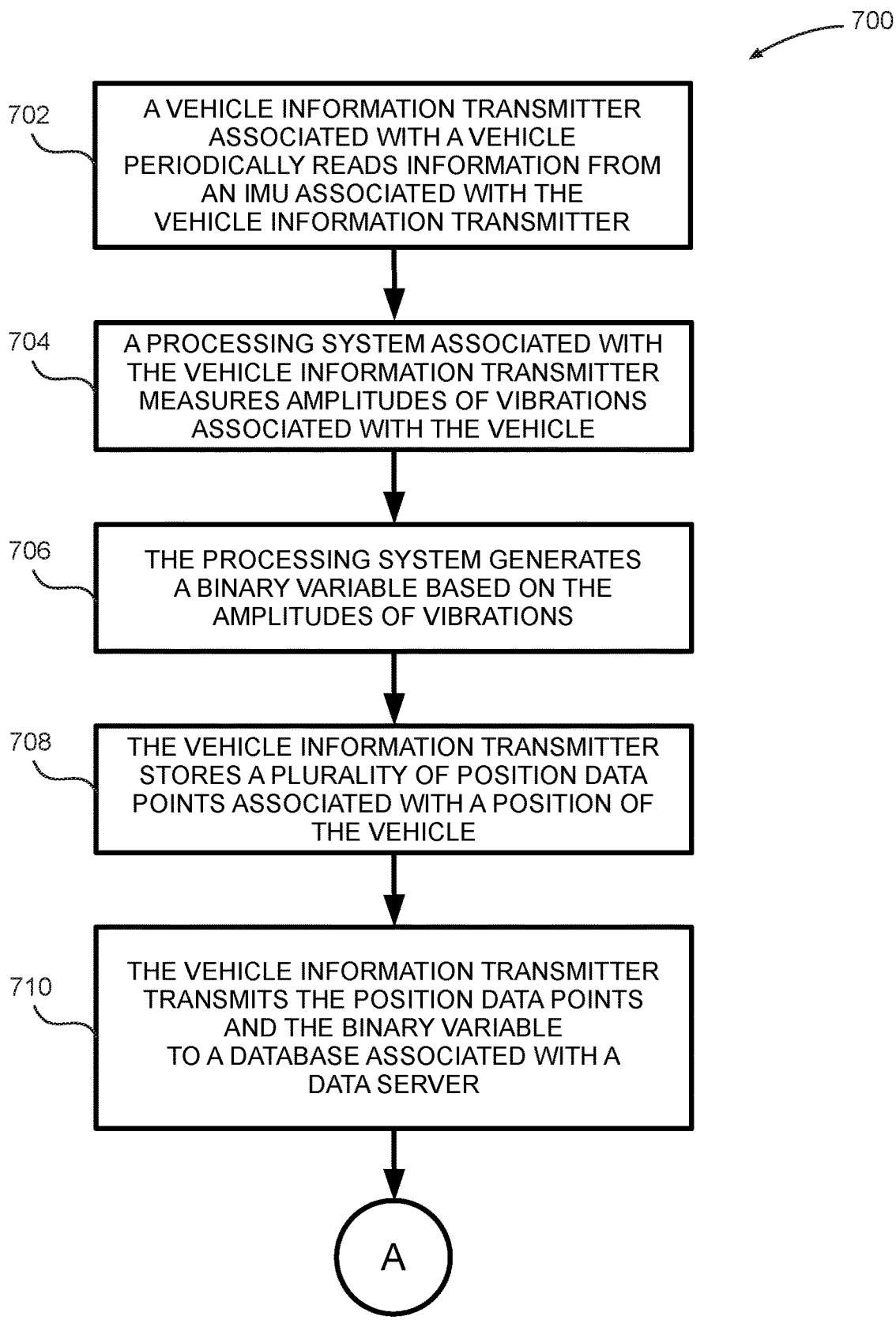
FIGS. 7A and 7B are flow diagrams depicting an embodiment of a method to determine a vehicle idle state.

FIG. 7A is a flow diagram depicting an embodiment of a method 700 to determine a vehicle idle state. At 702, a vehicle information transmitter associated with a vehicle periodically reads information from an inertial measurement unit (IMU) associated with the vehicle information transmitter (e.g., IMU 204). Next, at 704, a processing system associated with the vehicle information transmitter (e.g., processing system 208) measures amplitudes of vibrations associated with the vehicle. In some embodiments, the amplitudes of vibrations are received by the processing system as output data from one or more accelerometers and gyroscopes associated with the IMU. In particular embodiments, this output data may be received by the processing system as vibration data at a rate of 200 Hz. In other words, the processing system polls the IMU for data at a rate of 200 Hz. At 706, the processing system applies a threshold to the vibration data (i.e., vibration amplitude measurements) to determine whether an engine associated with the vehicle is running, and generates a binary variable (engine running or not running) in response to the thresholding process. At 708, vehicle information transmitter stores a plurality of position data points associated with a position of the vehicle. These position data points may be generated by a GPS receiver (e.g., GPS 202) associated with the vehicle information transmitter. At 710, the vehicle information transmitter transmits the position data points and the binary variable to a database (e.g., database 104) associated with a data server (e.g., data server 102). The method then goes to A, with a continued description in the description of FIG. 7B.

Figure 7B:
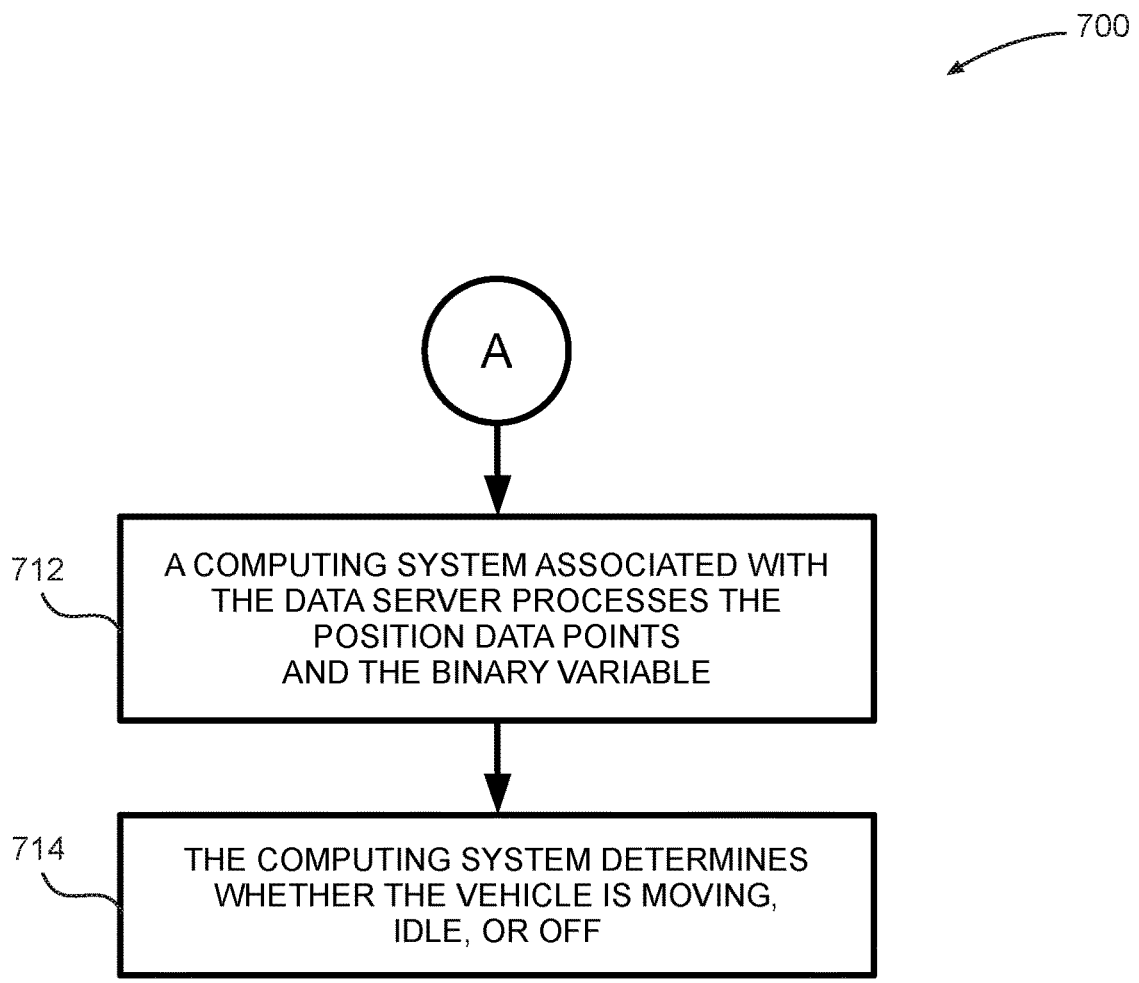

FIG. 7B is a flow diagram depicting a continued description of method 700. Starting at A, the method goes to 712, where a computing system (e.g., computing system 106) associated with the data server processes the position data points and the binary variable. In some embodiments, the computing system performs real-time kinematic (RTK) GPS processing on the position data points using position data from reference data points. This allows for more accurate vehicle position calculations to be performed. Using these measured and calculated values, the method goes to 714, where the computing system correlates these measured and calculated values with the vehicle's velocity as determined by the RTK GPS processing to categorize the vehicle operation into three categories:

Binary variable=running and vehicle velocity>0 (vehicle moving) signifies that the vehicle is working.

Binary variable=running and vehicle velocity=0 (vehicle stationary) signifies that the vehicle is idle.

Binary variable=not running and vehicle velocity=0 (vehicle stationary) signifies that the vehicle is off.

This method is useful to remotely monitor idle vehicle conditions that can cost the vehicle operator time and money, and result in unnecessary delays in work progress.

Figure 8A:
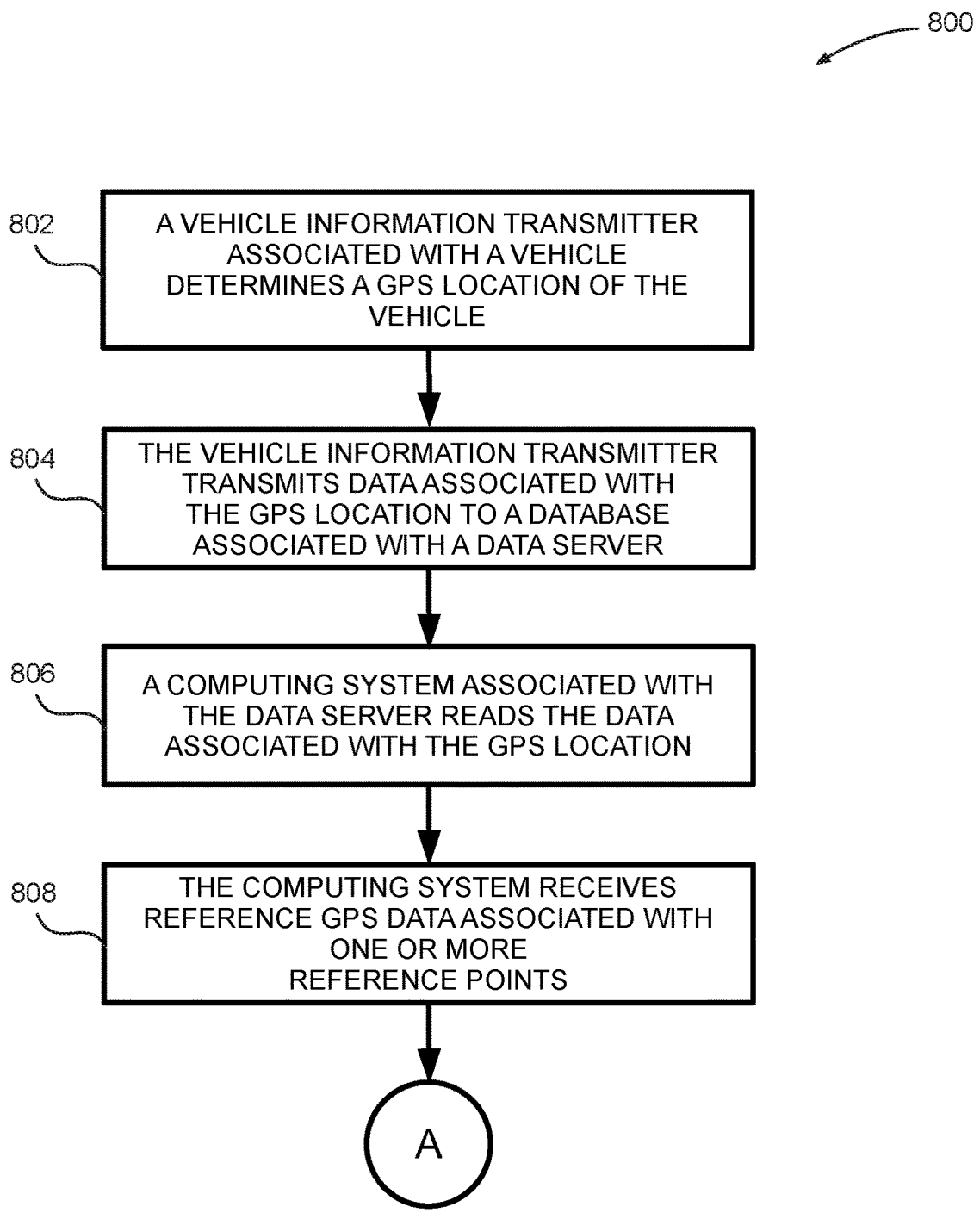
FIGS. 8A and 8B are flow diagrams depicting an embodiment of a method to perform a server-side RTK positioning.

FIG. 8A is a flow diagram depicting an embodiment of a method 800 to perform a server-side RTK positioning. Real-time kinematic (RTK) positioning improves an accuracy of GPS measurements by correcting the GPS measurements with GPS positioning data derived from one or more known reference points. In order to implement server-side RTK positioning, at 802, a vehicle information transmitter (e.g., vehicle information transmitter 112) associated with a vehicle determines a GPS location of the vehicle using, for example, GPS 202. Next, at 804, the vehicle information transmitter transmits data associated with the GPS location (i.e., GPS data) to a database (e.g., database 104) associated with a data server (e.g., data server 102). In some embodiments, the data server is located at a different physical location (i.e., at a remote location) from the vehicle. At 806, a computing system (e.g., computing system 106) associated with the data server reads the data associated with the GPS location from the database. Next, at 808, the computing system receives reference GPS data associated with one or more reference points whose position coordinates are accurately known. The method then goes to A, with a continued description in the description of FIG. 8B.

Figure 8B:
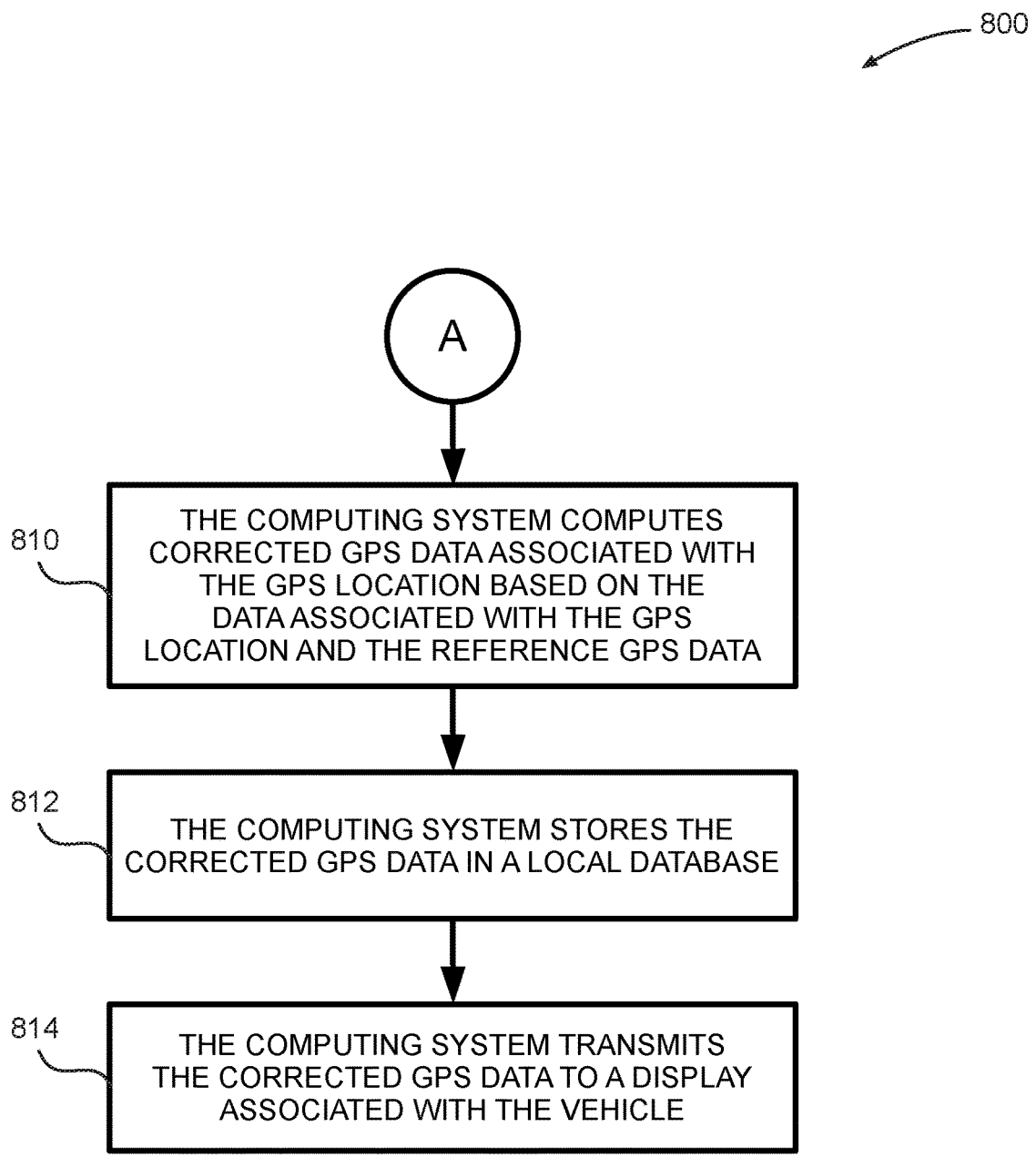

FIG. 8B is a flow diagram depicting a continued description of method 800. Starting at A, the method goes to 810, where the computing system computes corrected GPS data based on the data associated with the GPS location (i.e., associated with the location of the vehicle information transmitter) based on the data associated with the GPS location and the reference GPS data. At 812, the computing system stores the corrected GPS data in a local database such as database 104. This stored data may be viewed by an operator of the system using a suitable display device (e.g., via user interface 108). At 814, the computing system transmits the corrected GPS data to a display associated with the vehicle, or to some other display device. In some embodiments, GPS measurement is accurate down to approximately 1 cm. Since RTK processing is performed by the computing system associated with the data server, this method is referred to as server-side RTK positioning, and can be performed in near-real-time.

Figure 9:
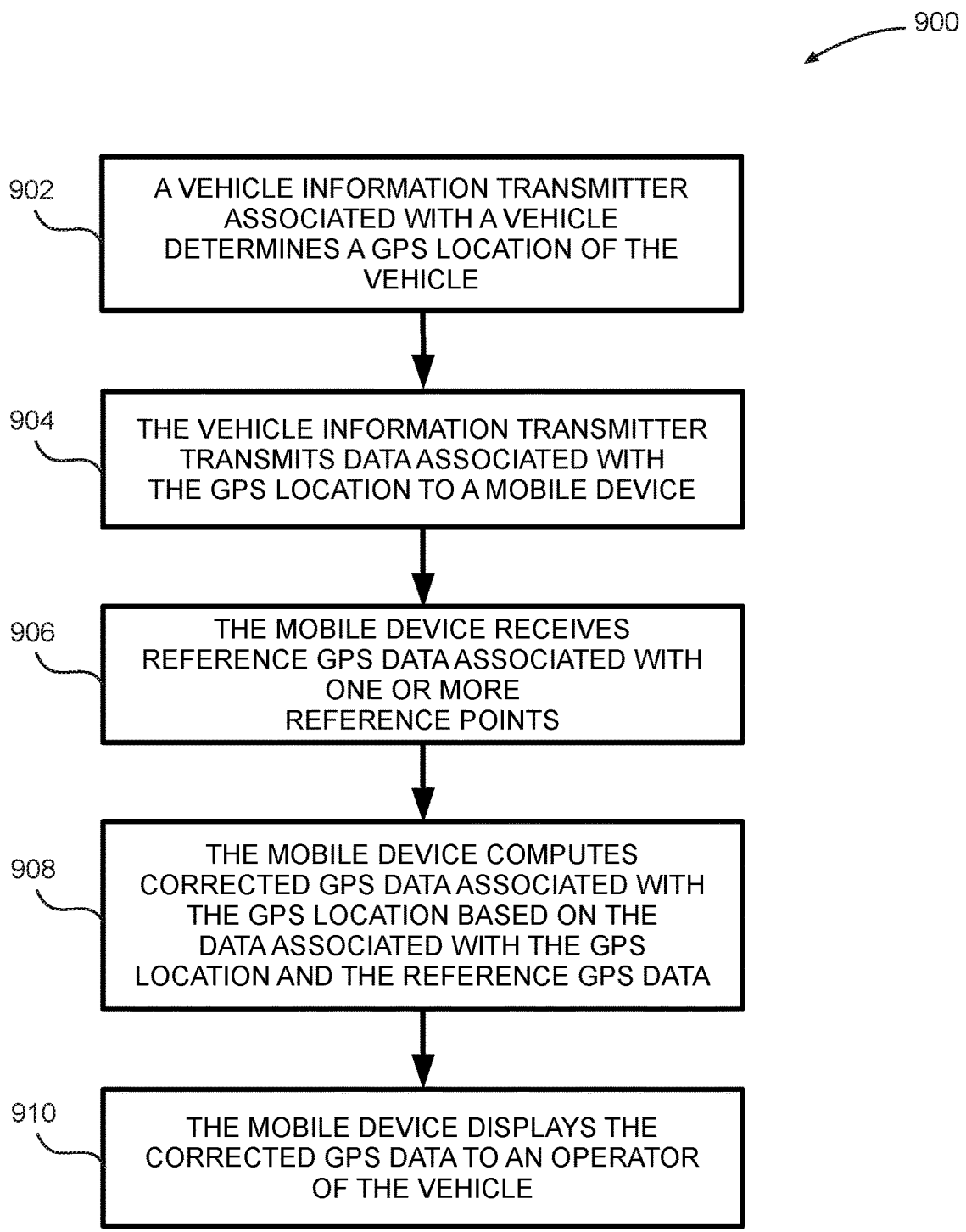
FIG. 9 is a flow diagram depicting an embodiment of a method for RTK positioning using a mobile device.

FIG. 9 is a flow diagram depicting an embodiment of a method 900 for RTK positioning using a mobile device. Rather than having to transmit data associated with the GPS location to a remote server as performed by method 800, a vehicle information transmitter can avail of processing power available on mobile devices and transmit the data associated with the GPS location to a mobile device for RTK processing using, for example, a Bluetooth communication link. Method 900 describes such an operation. At 902, a vehicle information transmitter (e.g., vehicle information transmitter 112) associated with a vehicle determines a GPS location of the vehicle using, for example, GPS 202. Next, at 904, the vehicle information transmitter transmits data associated with the GPS location (i.e., GPS data) to a mobile device. In some embodiments, the mobile device could be any of a mobile phone, a tablet, a laptop computer, or any other similar mobile device. In particular embodiments, the mobile device may be in the possession of or accessible to an operator of the vehicle, or located within the vehicle. At 906, the mobile device receives reference GPS data associated with one or more reference points with an accurately-measured location. At 908, the mobile device computes corrected GPS data associated with the GPS location based on the data associated with the GPS location and the reference GPS data. Finally, at 910, the mobile device displays the corrected GPS data to an operator of the vehicle at centimeter-level accuracy in near-real-time. An advantage of performing RTK processing on the mobile device as opposed to server-side RTK positioning is that the former avoids any network-related latency associated with server-side RTK positioning.

Figure 10A:
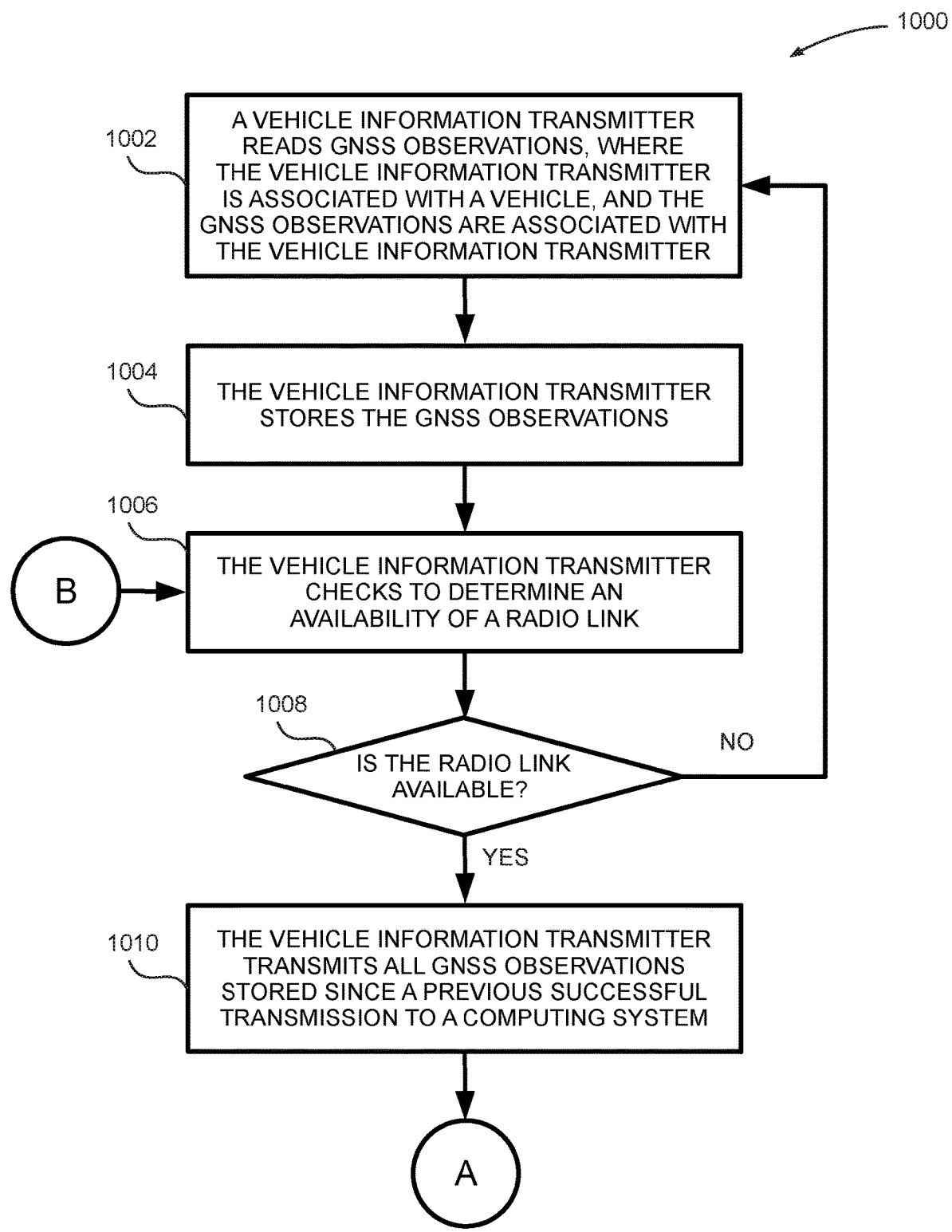
FIGS. 10A and 10B are flow diagrams depicting an embodiment of a method to implement link loss tolerance using a vehicle information transmitter.

FIG. 10A is a flow diagram depicting an embodiment of a method 1000 to implement link loss tolerance using a vehicle information transmitter. In some embodiments, a vehicle information transmitter (e.g., vehicle information transmitter 112) transmits data to a data server (e.g., data server 102) using a public network (e.g., public network 110). This data can be continually streamed or transmitted in bursts. Either way, there is a risk of data loss due link loss or link disruption. To account for this, link loss tolerance is built into some embodiments of a remote vehicle state estimation system that uses a vehicle information transmitter. Method 1000 is associated with a sequence of operations for a link loss-tolerant vehicle information transmitter.

At 1002, a vehicle information transmitter reads GNSS (i.e., GPS) observations, where the vehicle information transmitter is associated with a vehicle, and the GNSS observations are associated with the vehicle information transmitter that may have been suitably calibrated as discussed herein. In some embodiments, the GNSS observations (i.e., measurements) are generated by GPS 202. At 1004, the vehicle information transmitter stores the GNSS observations in, for example, a memory such as memory 212. In some embodiments, the memory is a first-in, first-out (FIFO) queue buffer implemented in flash memory. In particular embodiments, the memory may store several days' worth of GNSS observations. Next, at 1006, the vehicle information transmitter checks to determine an availability of a radio link. In some embodiments, the radio link may be a 4G network communication link that allows the vehicle information transmitter to communicate with the data server via the public network. At 1008, if the radio link is available, then the method goes to 1010, where the vehicle information transmitter transmits all GNSS observations stored since a previous successful transmission, thereby emptying out the contents of the FIFO memory. In some embodiments, these observations are transmitted to a computing system (e.g., computing system 106) that is a part of the data server. The algorithm then goes to A, with a continued description in FIG. 10B. On the other hand, if at 1008, the radio link is not available, then the method returns back to 1002, where it goes through the process of reading in and storing in the FIFO memory the next set of GNSS observations.

Figure 10B:
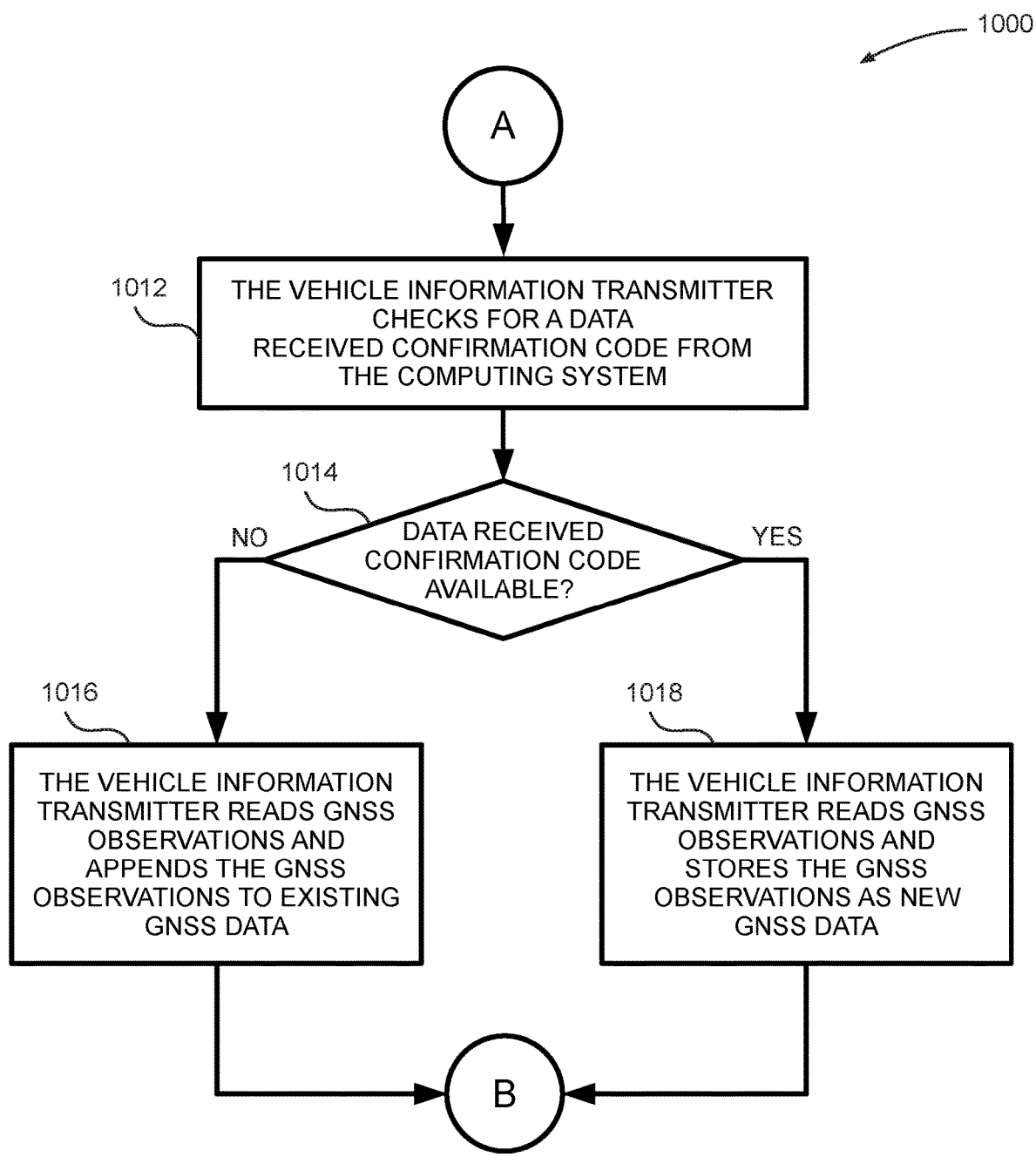

FIG. 10B is a flow diagram depicting a continued description of method 1000. Starting at A, the method goes to 1012, where the vehicle information transmitter checks to see whether a data received confirmation code from the computing system is available. In some embodiments, the data received confirmation code is an HTTP 200 OK status code when data is successfully received by the computing system. At 1014, if the data received confirmation code is available (i.e., if the data received confirmation code has been successfully received from the computing system), then the method goes to 1018, where the vehicle information transmitter reads GNSS observations and stores the GNSS observations as new GNSS data. The method then goes to B, and returns to the point B in FIG. 10A. On the other hand, if the data received confirmation code is not available at 1014, then the method goes to 1016, where the vehicle information transmitter reads GNSS observations and appends the GNSS observations to existing GNSS data. The algorithm then goes to B, and returns to point B in FIG. 10A.

Figure 11:
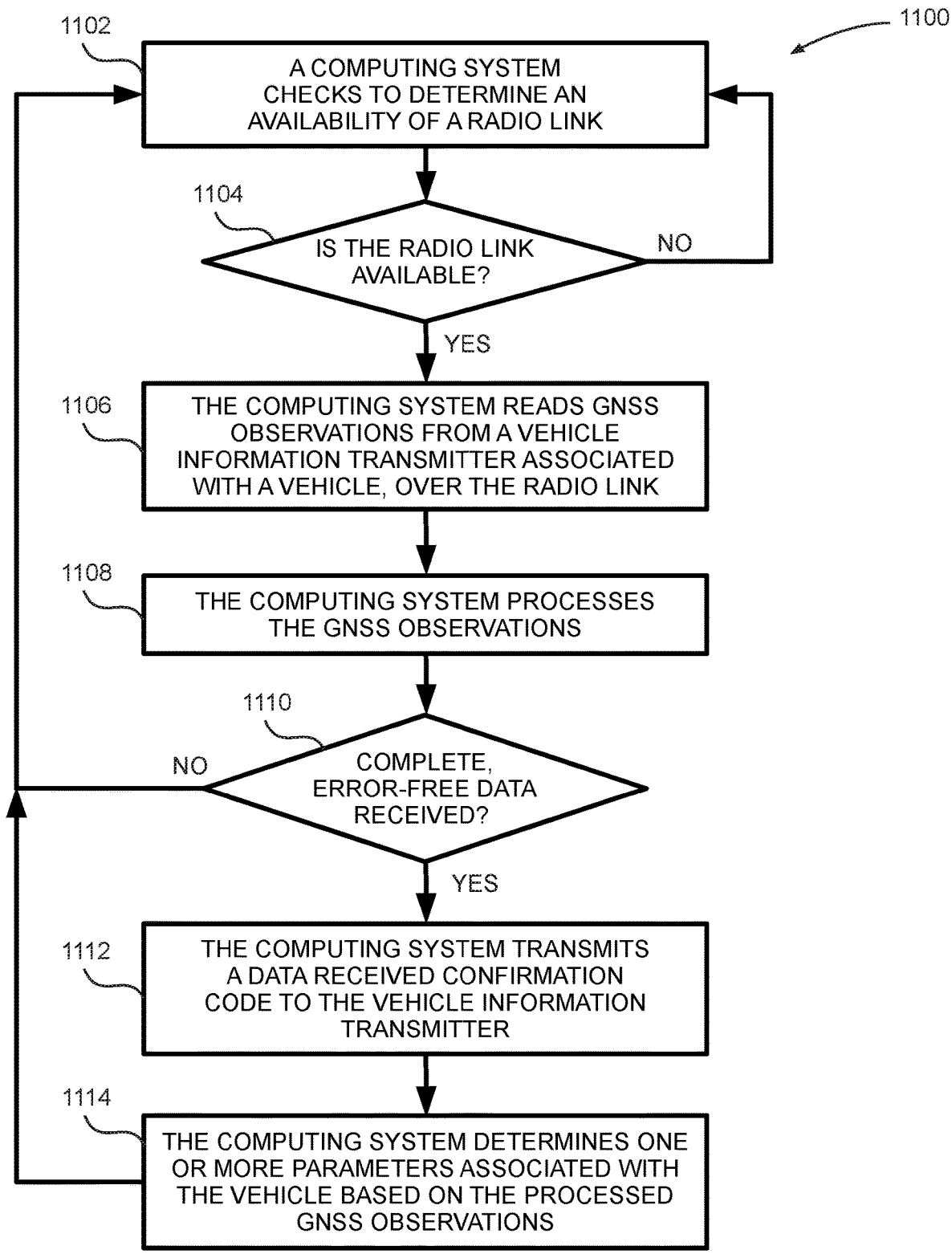
FIG. 11 is a flow diagram depicting an embodiment of a method to implement link loss tolerance using a computing system.

FIG. 11 is a flow diagram depicting an embodiment of a method 1100 to implement link loss tolerance using a computing system (e.g., computing system 106). In some embodiments, method 1100 is a workflow that executes on the computing system in parallel with the method 1000. In other words, method 1000 is a workflow that executes on an associated vehicle information transmitter, while method 1100 is a counterpart workflow that executes on the computing system referenced in method 1000.

At 1102, a computing system associated with a data server (e.g., data server 102) checks to determine an availability of a radio link that allows the computing system to receive GNSS observations from a vehicle information transmitter associated with a vehicle. In some embodiments, the radio link may be a 4G network communication link that allows the vehicle information transmitter to communicate with the data server via the public network. At 1104, if the radio link is not available, then the computing system goes back to 1102, where it continues polling the radio link to determine availability.

On the other hand, if the radio link is available at 1104, then the method goes to 1106, where the computing system reads any available GNSS observations from the vehicle information transmitter over the radio link. At 1108, the computing system processes the GNSS observations, and at 1110, the method checks to determine whether the data received is complete and error-free. If the data is not complete and error-free, then the algorithm returns back to 1102, and the computing system does not send a data received confirmation code (such as an HTTP 200 OK code) to the vehicle information transmitter. As presented in method 1000, if the vehicle information transmitter does not receive the data received confirmation code, it attempts to re-transmit the data, with new data appended, if necessary. On the other hand, if the computing system determines that complete and error-free data has been received at 1110, then method goes to 1112, where the computing system transmits a data received confirmation code (such as an HTTP 200 OK code) to the vehicle information transmitter. Finally, at 1114, based on the processed GNSS observations, the computing system determines one or more parameters associated with the vehicle (e.g., vehicle position, or whether the vehicle engine is on or off). The method returns to 1102; the computing system continues to process GNSS observations received from the vehicle information system till an input queue associated with the data server is empty (for example, due to a loss of the radio link).

In the event of radio link loss and subsequent radio link re-establishment, historical GNSS data stored in the FIFO on the vehicle information transmitter is transmitted over the radio link as fast as the radio link allows so that the processed data stream can catch up to real-time. A double-buffering scheme that may be implemented using a FIFO on the vehicle information transmitter and the server input queue on the data server ensures that no data is lost, hence implementing a link loss-tolerant data buffering scheme.

Figure 12:
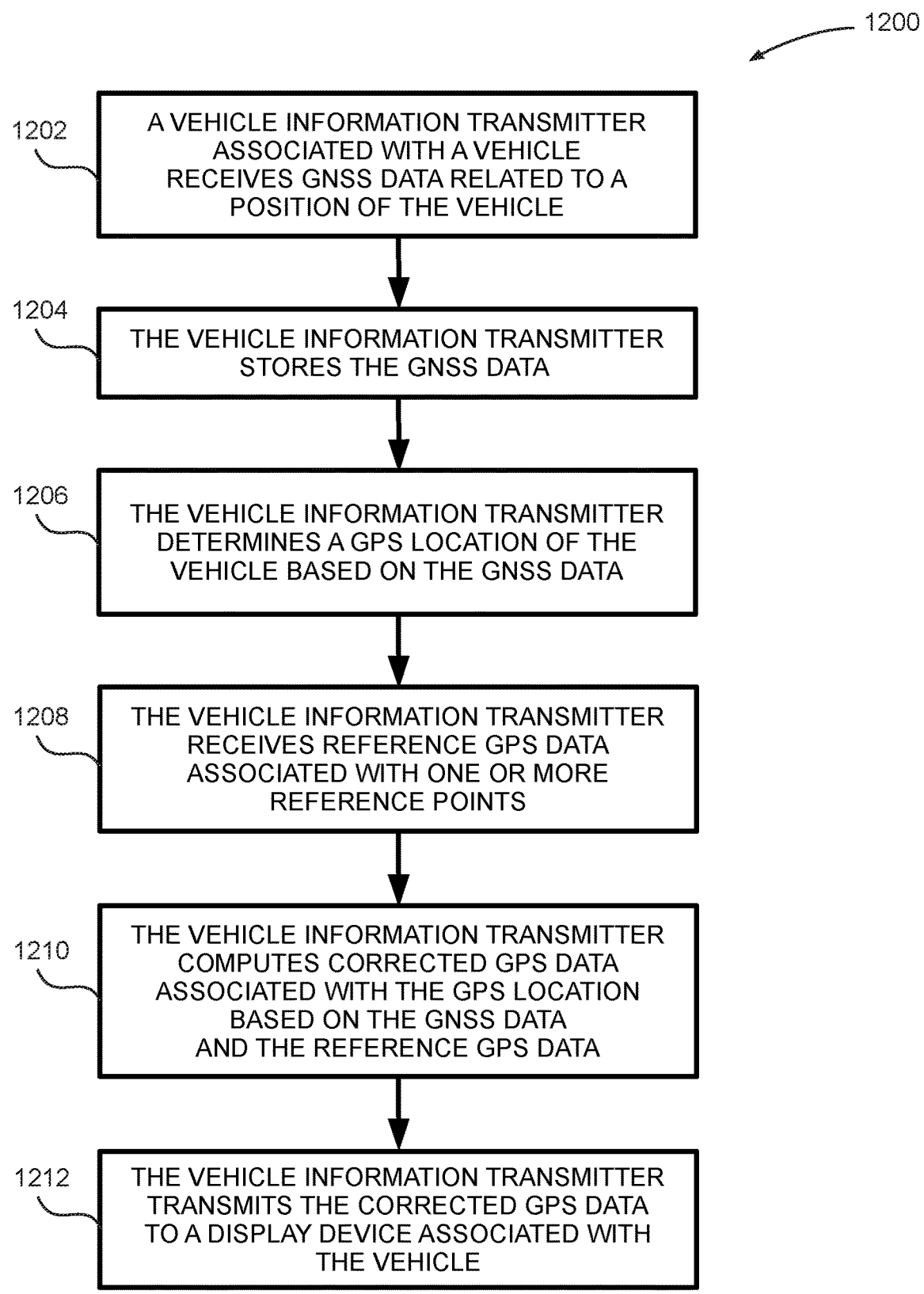
FIG. 12 is a flow diagram depicting an embodiment of a method to implement RTK positioning.

FIG. 12 is a flow diagram depicting an embodiment of a method 1200 to implement RTK positioning. Referring back to the RTK positioning process described earlier in method 800, another method that can be used to implement RTK positioning is to enable a vehicle information transmitter to perform on-board RTK-related computations. A flow diagram depicting this process is shown in FIG. 12. At 1202, a vehicle information transmitter (e.g., vehicle information transmitter 112) associated with a vehicle receives GNSS data related to a position of the vehicle. In some embodiments, the vehicle information transmitter receives this GNSS data from GPS 202. At 1204, the vehicle information transmitter stores the GNSS data in, for example, memory 212. Next, at 1206, the vehicle information transmitter determines a GPS location of the vehicle based on the GNSS data. In some embodiments, determining the GPS location of the vehicle may be implemented on the GPS itself. In other embodiments, raw GNSS data may be stored in memory for post processing by, for example, processing system 208.

At 1208, the vehicle information transmitter receives reference GPS data associated with one or more reference points. In some embodiments, the reference GPS data may be received from database 104 associated with the data server 102. In other embodiments, the reference GPS data may be received from one or more GPS base stations via a network such as the Internet. In some embodiments, the reference GPS data is associated with one or more reference points whose coordinates are accurately known. At 1210, the vehicle information transmitter computes corrected GPS data associated with the GPS location based on the GNSS data and the reference GPS data. This step involves performing the RTK processing on the vehicle information transmitter itself, and may be implemented on processing system 208. Finally, at 1212, the vehicle information transmitter transmits the corrected GPS data to a display device associated with the vehicle. In some embodiments, the display device is a video display terminal such as an LCD display in the vehicle. In other embodiments, the display device is a display device associated with a mobile device or some other computing device in the possession of a driver of the vehicle. In other words, the vehicle information transmitter may transmit the corrected GPS data to a mobile phone, a laptop computer, a tablet computer, or similar device in the possession of the driver of the vehicle via, for example, a Bluetooth connection, or some other wireless or wired connection.

Figure 13:
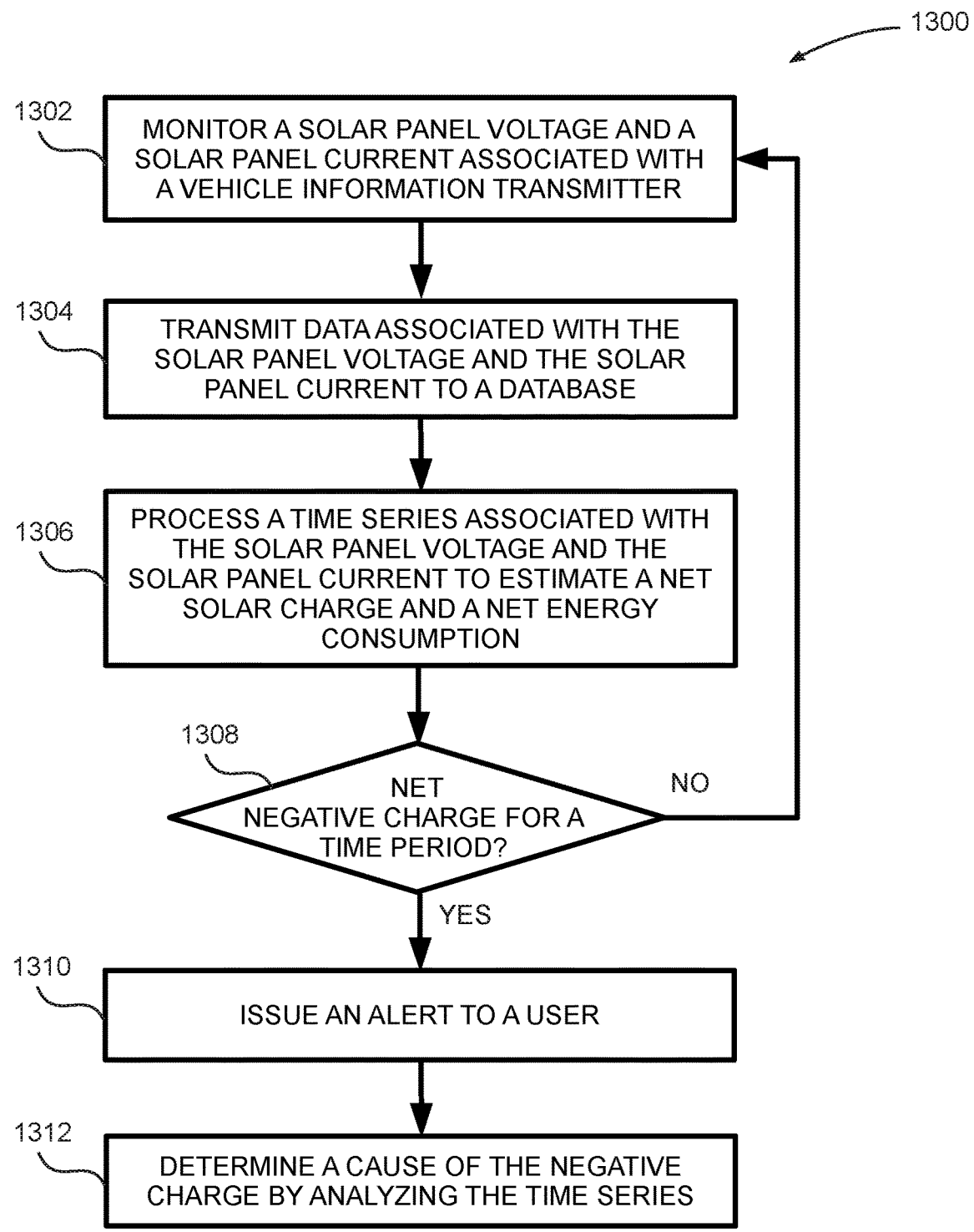
FIG. 13 is a flow diagram depicting an embodiment of a method to detect a cause of a negative charge.

FIG. 13 is a flow diagram depicting an embodiment of a method 1300 to detect a cause of a negative charge. Some embodiments of a vehicle information transmitter are powered by one or more solar cells, or solar panels. Method 1300 is configured to detect an anomalous operation associated with the solar panels resulting in, for example, a negative charge, or a net negative electric charge. At 1302, a solar panel voltage and a solar panel current associated with a vehicle information transmitter are monitored. In some embodiments, solar panel voltage and current measurements are taken every 30 seconds. At 1304, the vehicle information transmitter transmits data associated with the solar panel voltage and the solar panel current to a database such as database 104. At 1306, a time series associated with the solar panel voltage and the solar panel current is processed to estimate a net solar charge and a net energy consumption. In some embodiments, the time series is generated by a (voltagexcurrent) power product, and a computing system (e.g., computing system 106) integrates (i.e., processes) the power product time series to estimate the net solar charge and the net energy consumption.

At 1308, the method checks to determine whether a net charge computed using the power product time series is negative for a specific time period (e.g., a week). If the power net charge is not negative, then the method returns back to 1302. On the other hand, if at 1308, the net charge is negative, then the method goes to 1310, where an alert is issued to a user. In some embodiments, the user is alerted using a messaging system such as SMS, a mobile push notification, an email, or another transactional communication platform. In some embodiments, processing functions associated with method 1300 may be performed by computing system 106.

At 1312, a cause of the negative charge is determined by analyzing the time series. In some embodiments, the negative charge may be caused due to any combination of the following:

If a peak charge current is low and decreasing with time, one or solar panels associated with the vehicle information transmitter are likely obscured by dirt and the user will be instructed to clean the solar panels.

If a duration of net charge per day is low, it is possible that the vehicle information transmitter is being used in an area with insufficient sunlight, or the solar cells/solar panels are obscured for a part of the day. This data can be cross-referenced with weather observations and predicted solar irradiance from a third-party source (API) given a geographic position of the vehicle information transmitter derived from GPS.

If energy put into a battery associated with the vehicle information transmitter is significantly higher than the energy used, then the battery (e.g., battery 216) may not be operating efficiently. This is likely due to low ambient temperature and can be confirmed by referencing the time series temperature data from the device's inbuilt thermometer. In some embodiments, freezing temperatures may adversely affect battery performance.

Figure 14:
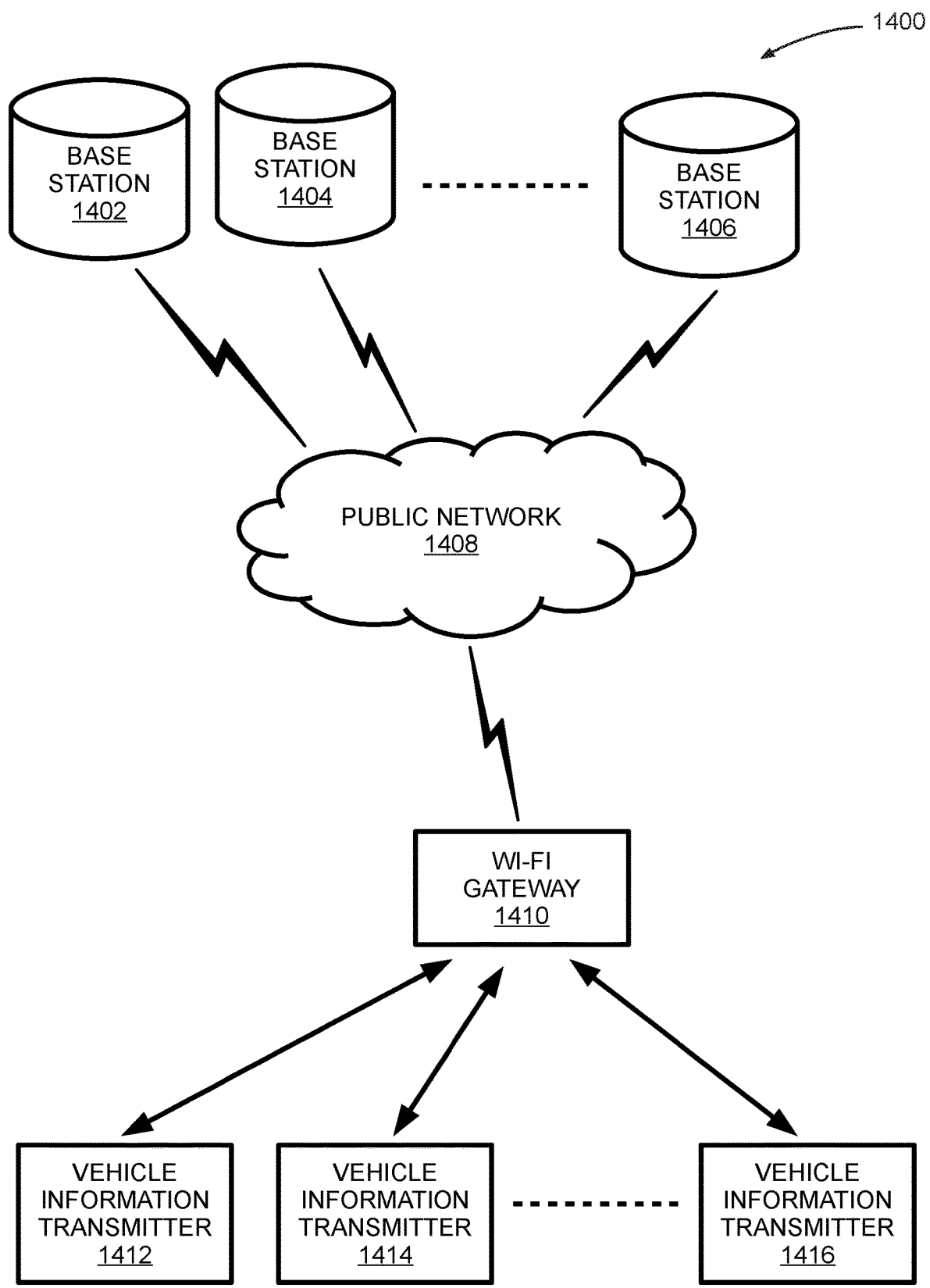
FIG. 14 is a block diagram depicting an embodiment of an RTK positioning system.

FIG. 14 is a block diagram depicting an embodiment of an RTK positioning system 1400. An advantage of enabling a vehicle information transmitter to perform on-board RTK processing has an advantage of providing low latency, and resilience to a loss in communication links. For example, FIG. 8 depicts a server-side RTK processing algorithm, where GNSS data is transmitted to the computing system over the public network. The scheme depicted in FIG. 8 may pose two difficulties. The first is a latency associated with transmitting and receiving data over the public network. The second is a possibility of an associated communication link associated with the public network being unavailable. This second possibility causes additional difficulties such as:

1. Unavailability of RTK data, and
2. GNSS data overflow on the vehicle information transmitter.

Processing RTK data on the vehicle information transmitter itself reduces latency and reduces the chances of results being degraded by an unavailability of the public network. Such an algorithm is presented in FIG. 12. A block diagram showing an implementation of the RTK algorithm as implemented on multiple vehicle information transmitters is shown in FIG. 14 as RTK positioning system 1400. In some embodiments, RTK positioning system 1400 includes a plurality of vehicle information transmitters—a vehicle information transmitter 1412, a vehicle information transmitter 1414, through a vehicle information transmitter 1416. Each of vehicle information transmitter 1412 through vehicle information transmitter 1416 is communicatively coupled, via a Wi-Fi gateway 1410 and a public network 1408 (e.g., the Internet), to a plurality of RTK base stations—a base station 1402, a base station 1404, through a base station 1406. Each of base station 1402 through base station 1406 stores one or more positioning reference points (e.g., reference GPS data) whose coordinates are accurately known. This data is available to each of vehicle information transmitter 1412 through vehicle information transmitter 1416 to enable RTK processing on each of vehicle information transmitter 1412 through vehicle information transmitter 1416 in substantially real-time.

In some embodiments, each of vehicle information transmitter 1412 through vehicle information transmitter 1416 is communicatively coupled with Wi-Fi gateway 1410 via a Wi-Fi communication link.

Figure 15:
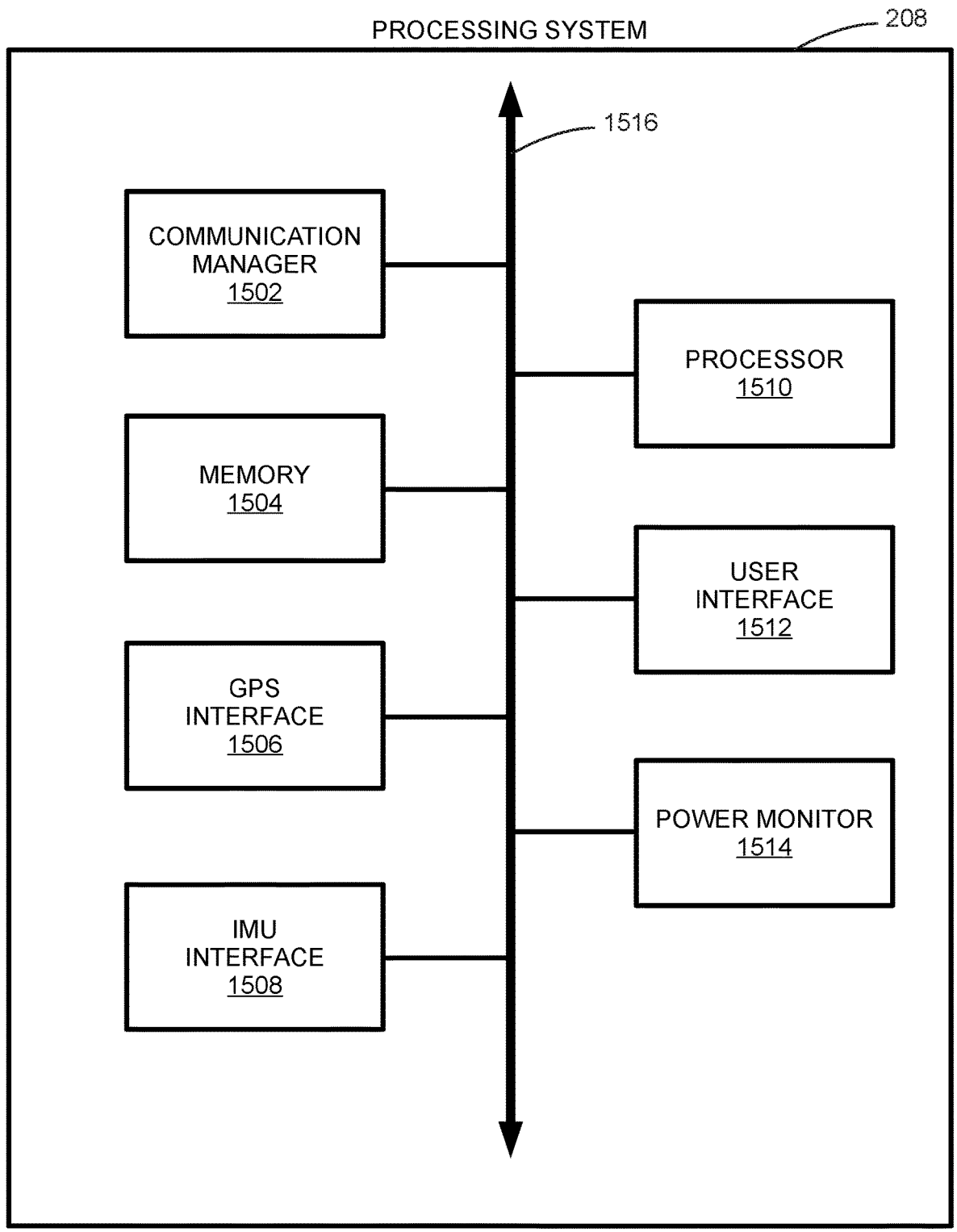
FIG. 15 is a block diagram depicting an embodiment of a processing system that may be used to implement certain functionalities of a vehicle information transmitter.

FIG. 15 is a block diagram depicting an embodiment of a processing system 208 that may be used to implement certain functionalities of a vehicle information transmitter. In some embodiments, processing system 208 includes a communication manager 1502 that is configured to manage communication protocols and associated communication with external peripheral devices as well as communication with other components in processing system 208. For example, communication manager 1502 may be responsible for generating and maintaining the communication interface between processing system 208 and other components of vehicle information transmitter 200, such as memory 212.

In some embodiments, processing system 208 includes a memory 1504 that is configured to store data associated with operations of vehicle information transmitter 200. In particular embodiments, memory 1504 includes both long-term memory and short-term memory. Memory 1504 may be comprised of any combination of hard disk drives, flash memory, random access memory, read-only memory, solid state drives, and other memory components.

A GPS interface 1506 included in some embodiments of processing system 208 allows processing system to read GPS data from GPS 202 or some other GPS receiver. This GPS data may be used for on-board RTK processing associated with vehicle information transmitter 200. Some embodiments of processing system 208 include an IMU interface 1508 that enable processing system 208 to interface with IMU 204. IMU interface 1508 allows processing system 208 to read in linear and angular acceleration measurements captured by IMU 204.

In some embodiments, processing system 208 includes a processor 1510 that is configured to perform functions that may include generalized processing functions, arithmetic functions, and so on. In embodiments, processor 1510 may be responsible for performing on-board RTK computing operations such as the operations described by method 1200.

A user interface 1512 included in some embodiments of processing system 208 enables a user to interact with processing system 208, and with different components of vehicle information transmitter 200. For example, a user may be able to connect to vehicle information transmitter either remotely, or via a local wired connection (e.g., USB or Ethernet). The user may then be able to access different functions of vehicle information transmitter, perform diagnostic functions, and so on.

Some embodiments of processing system 208 include a power monitor 1514 that is configured to monitor a power generated by solar panel 214, or battery 216. In some embodiments, power monitor 1514 may supervise one or more functions of power distribution system 218 to different components of vehicle information transmitter 200. Power monitor 1514 may also receive data associated with an implementation of method 1300. A databus 1516 included in some embodiments of processing system 208 is configured to communicatively couple and transfer data and other signals between the different components of processing system 208.

Figure 16:
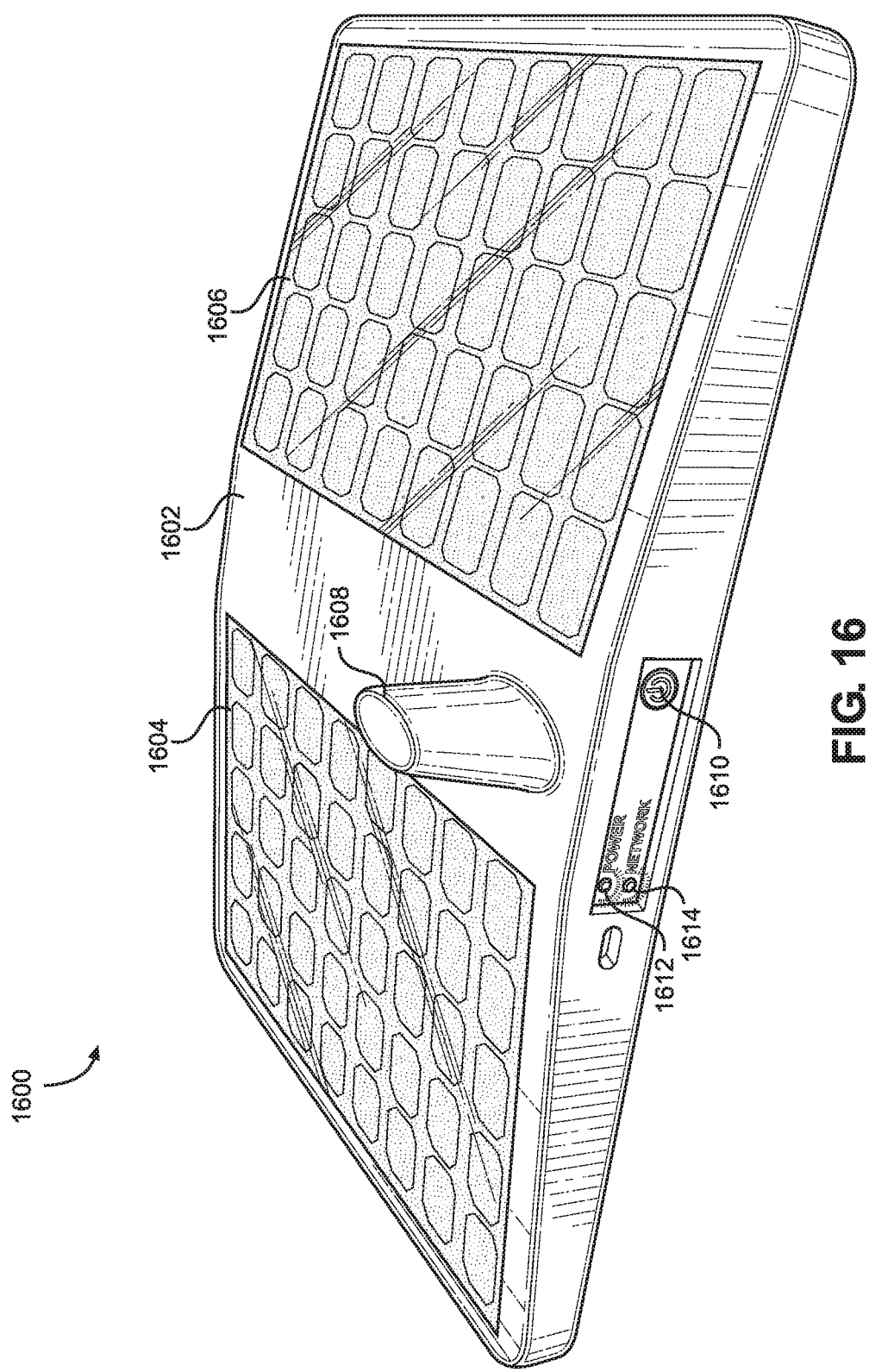
FIG. 16 is a line drawing that presents an isometric view of a vehicle information transmitter.

FIG. 16 is a line drawing that presents an isometric view 1600 of a vehicle information transmitter. Isometric view 1600 shows a vehicle information transmitter 1602. Some embodiments of vehicle information transmitter 1602 are referred to as DirtMates, abbreviated as "DMs." In some embodiments, vehicle information transmitter 1602 includes a first solar panel 1604 and a second solar panel 1606, where each of first solar panel 1604 and second solar panel 1606 is configured to generate electrical power from sunlight. This electrical power is used to power vehicle information transmitter 1602 and associated components, or to charge a rechargeable battery included in some embodiments of vehicle information transmitter 1602.

In some embodiments, vehicle information transmitter 1602 includes an antenna 1608 that allows vehicle information transmitter 1602 to perform wireless communication using wireless communication modalities such as Wi-Fi, mobile Internet (e.g., 4G or 5G), Bluetooth, and so on. Antenna 1608 allows vehicle information transmitter 1602 to communicate with, for example, data server 102 via public network 110. A power switch 1610 allows vehicle information transmitter 1602 to be powered on or off. A power LED 1612 when lit indicates that vehicle information transmitter 1602 is powered on; power LED 1612 is switched off when vehicle information transmitter 1602 is powered off. A network LED 1614 indicates network access by vehicle information transmitter 1602.

Advantages offered by a deployment of one or more vehicle information transmitters include:

1. Continuous tracking (visualization & analysis) of 100% of worksite progress and productivity at near survey-grade accuracy and in near real time, allowing supervisors to:
   a) Monitor 100% of daily operations at any time with sufficient accuracy to make good planning decisions
   b) Monitor all subcontractor activity automatically, helping to avoid disputes for all parties involved
   c) Localize any machine/vehicle/asset at any time
   d) Evaluate and optimize use of resources to meet targets
   e) Evaluate and ensure operational quality of each individual machine/operator
   f) Ensure haul road safety & optimize fuel cost
2. Providing real-time feedback to supervisors, allowing them to do their job with greater efficiency
3. Avoiding unnecessary cost from rework, by giving near real time alerts to supervisor
   a) Avoid overtime
   b) Avoid disputes with customers and subcontractors about what is moved when DM+Viewer (+Mobile app) implementation:

DMs continuously measure 3D location and speed of every machine on the worksite at high frequency (1-5 Hz) with near survey grade accuracy (sub-15 cm) using a solar-powered on-machine positioning sensor, and push measurement data along with installation data (detailing sensor setup on the machine) to a remote database whenever a wireless connection is available. Application software associated with the system (referred to as Propeller software or a Propeller mobile app) continuously processes the input from the machine fleet and updates the actual worksite surface model, making project status and progress visible to any authorized person in the office in near real time. Via a wireless connection, the Propeller mobile app pulls in local design surface data, live feedback, and alerts, and displays these on a handheld or machine mounted display, enabling the operator to do every job per engineering design.

DM key differentiators:
Full fleet coverage: DMs are designed to be mounted onto 100% of the fleet.

They go on every single machine that enters a worksite, unlike current worksite vehicle GPS, which is meant to monitor specific vehicles only.

Easy install & calibration: DMs can be very easily installed onto a fleet of mixed-brand and mixed-owner machines and require no human intervention for processing. Whenever human involvement is required, the system warns an administrator or machine operator. (Re-)Calibration happens often and automatically.

Seamless data transfer: DMs extract their value from seamless data transfer, processing & integration into a worksite surface tracking platform that allows users to visualize, measure, and compare current, historical, and designed surfaces.

Near survey grade accuracy: DMs use technology similar to vehicle positioning systems meant for theft detection and driver compliance and safety monitoring. DMs, however, can also offer valuable worksite survey data, because they use high positioning accuracy and update frequency.

Very low pricing: DMs are relatively inexpensive compared to other survey-grade worksite surface measurement tools including drones, GPS/laser based site positioning systems, and machine control. DMs can be much cheaper than machine control because continuous surface measurement:

requires only one-directional, potentially intermittent communication to push surface measurement data, and
requires minimal integration with the machine, and
can sacrifice (a lot of) bidirectional update continuity and realtimeness that is integrated into current machine control systems and is strictly necessary for autonomous operation of a machine blade on a human-operated machine.

Parts that go into complete value chain:
Solar-powered centimeter-accuracy high-frequency position measurement
Automated data offload to online database via intermittent wireless connectivity
Robust and foolproof mounting harness to connect to machine
Method to quickly mount/replace position sensors to machines and set up as a survey-grade surface measurement tool
Method to quickly and frequently (re)calibrate position sensors as a survey-grade surface measurement tool
Method to ensure 100% fleet coverage
System to continuously reconstruct a worksite surface using moving distributed position sensors, based on an assessment of the quality of each data source and weighting its contribution to the surface model
System to license/authorize data usage on a given worksite from machines of different owners, rental machines, etc.
System to (continuously) visualize, interrogate, and compare past, current, and design surfaces Other ways of phrasing the benefits/novelty that go beyond off-the-shelf fleet/asset management that become available to customers who are averse to investing in machine control for all of their machines. In some embodiments, the term "machine control" includes machine control using 3D guidance (also known as 3D machine control), where the machine reads in a design surface profile and a machine operator is able to see a location of the design surface relative to a tool (such as a bucket or a blade) used to cut the design surface. The machine operator can then steer the tool to match a predetermined surface design automatically. In some embodiments, the machine operator controls a movement of the machine and not the tool; the tool is moved autonomously by an intelligent control system associated with the machine, based on the design surface profile and the predetermined surface design. The following are the features associated with machine control:

System to continuously monitor worksite activity and work progress of mixed-brand and mixed-owner fleets of earthmoving machines and all other vehicles
Fully automated (no-touch) system for continuous worksite surveying
Haul road vehicles now become 2-axes road grade measurement tools Although the present disclosure is described in terms of certain example embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

What is claimed is:

1. A method comprising:
collecting data associated with a vehicle, wherein the data is collected by a vehicle information transmitter;
the vehicle information transmitter logging the data;
the vehicle information transmitter transmitting the data to a data server;
the data server processing the data;
the data server extracting vehicle information from the data responsive to the processing, wherein the vehicle information includes a terrain elevation;
the data server determining a state of the vehicle based on the vehicle information;
the data server generating a temporal history associated with the state; and
the data server generating a three-dimensional map of the terrain based on the temporal history.

2. The method of claim 1, further comprising:
comparing a current three-dimensional map to a previously-generated three-dimensional map; and
determining a rate of progress of a terrain modification operation associated with the terrain based on the comparing.

3. The method of claim 2, further comprising determining a productivity associated with the vehicle, wherein the productivity is determined based on the rate of progress.

4. The method of claim 2, wherein the terrain modification operation is any of a mining operation, a quarrying operation and an earth-moving operation.

5. The method of claim 1, further comprising:
measuring engine vibrations associated with the vehicle;
processing the engine vibration measurements; and determining whether the vehicle is moving, in an idle state, or off based on the processing.

6. The method of claim 5, wherein the engine vibrations are measured by any combination of an accelerometer and a gyroscope located on the vehicle.

7. The method of claim 5, further comprising generating a binary variable, wherein the binary variable assumes a nonzero value when a velocity associated with the vehicle is nonzero, and wherein the binary variable assumes a zero value when the velocity is zero.

8. The method of claim 1, further comprising the data server generating the three-dimensional map based on data received from a plurality of vehicles.

9. The method of claim 1, wherein the state includes any combination of a vehicle position, a vehicle velocity, a vehicle acceleration, and a terrain altitude.

10. The method of claim 1, further comprising performing real-time kinematic (RTK) positioning to refine a position measurement associated with the vehicle.

11. An apparatus to determine a state of a vehicle, the apparatus comprising:
a vehicle information transmitter physically coupled to the vehicle; and
a data server communicatively coupled to the vehicle information transmitter, wherein the vehicle information transmitter collects data associated with the vehicle, wherein the vehicle information transmitter logs the data, wherein the vehicle information transmitter transmits the data to the data server, wherein the data server is configured to:
store the data;
extract vehicle information from the data, wherein the vehicle information includes a terrain elevation;
determine a state of the vehicle based on the vehicle information;
generate a temporal history associated with the state; and
generate a three-dimensional map of the terrain based on the temporal history.

12. The apparatus of claim 11, wherein the vehicle information transmitter is identified by a unique device ID.

13. The apparatus of claim 11, wherein the vehicle information transmitter includes a GPS and an IMU.

14. The apparatus of claim 11, further comprising any combination of an accelerometer and a gyroscope configured to measure engine vibrations associated with the vehicle, wherein the data server:
receives the engine vibration measurements;
processes the engine vibration measurements; and
determines whether the vehicle is moving, in an idle state, or off.

15. The apparatus of claim 14, wherein the data server generates a binary variable, wherein the binary variable assumes a nonzero value when a velocity associated with the vehicle is nonzero, and wherein the binary variable assumes a zero value when the velocity is zero.

16. The apparatus of claim 11, wherein the state includes any combination of a vehicle position, a vehicle velocity, a vehicle acceleration, and a terrain altitude.

17. The apparatus of claim 11, wherein data server generates the three-dimensional map based on data received from a plurality of vehicles.

18. The apparatus of claim 11, wherein the data server is configured to perform real-time kinematic (RTK) positioning to refine a position measurement associated with the vehicle.

19. The apparatus of claim 11, wherein the data server is further configured to:
compare a current three-dimensional map to a previously-generated three-dimensional map; and
determine a rate of progress of a mining operation associated with the terrain.

20. The apparatus of claim 19, wherein the data server determines a productivity associated with the vehicle, wherein the productivity is determined based on the rate of progress.

21. A method to calibrate a vehicle information transmitter associated with a vehicle, the method comprising:
establishing a first reference point and a second reference point at a remote location, wherein the first reference point and the second reference point are located on a terrain on which the vehicle is positioned;
defining a line joining the first reference point and the second reference point;
traversing, by the vehicle, a path relative to the line;
storing, by the vehicle information transmitter, a plurality of position data points associated with the path;
transmitting, by the vehicle information transmitter, the position data points to a computing system;
interpolating, by the computing system, the position data points;
computing, by the computing system, a height of the vehicle information transmitter relative to the first reference point and the second reference point, and computing, by the computing system, a height of the vehicle information transmitter relative to the vehicle.

* * * * *